US 11,472,958 B2

United States Patent
Naruse et al.

(10) Patent No.: US 11,472,958 B2
(45) Date of Patent: Oct. 18, 2022

(54) POWDER FOR SOLID FREEFORM FABRICATION AND METHOD OF MANUFACTURING SOLID FREEFORM FABRICATION OBJECT

(71) Applicant: RICOH COMPANY, LTD., Tokyo (JP)

(72) Inventors: Mitsuru Naruse, Shizuoka (JP); Akira Saito, Kanagawa (JP); Hitoshi Iwatsuki, Kanagawa (JP); Yasuyuki Yamashita, Kanagawa (JP); Toshiyuki Mutoh, Kanagawa (JP); Yasutomo Aman, Kanagawa (JP); Kiichi Kamoda, Kanagawa (JP); Sohichiroh Iida, Kanagawa (JP); Shinzo Higuchi, Tokyo (JP); Toshiyuki Iseki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 757 days.

(21) Appl. No.: 16/268,529

(22) Filed: Feb. 6, 2019

(65) Prior Publication Data
US 2019/0241734 A1 Aug. 8, 2019

(30) Foreign Application Priority Data

Feb. 7, 2018 (JP) .............................. JP2018-019939
Jun. 28, 2018 (JP) .............................. JP2018-122860

(51) Int. Cl.
*C08L 67/02* (2006.01)
*B29C 64/153* (2017.01)
(Continued)

(52) U.S. Cl.
CPC ................ *C08L 67/02* (2013.01); *B29B 9/04* (2013.01); *B29B 9/12* (2013.01); *B29B 9/16* (2013.01);
(Continued)

(58) Field of Classification Search
CPC ...... C08L 67/02; C08L 2205/025; B29B 9/04; B29B 9/12; B29B 9/16; B29B 9/06;
(Continued)

(56) References Cited

U.S. PATENT DOCUMENTS 5,532,282 A 7/1996 Needham
5,968,606 A * 10/1999 Osuna .................. C09D 11/101
524/495
(Continued)

FOREIGN PATENT DOCUMENTS

CA 3 021 762 A1 10/2017
CN 106457668 * 2/2017
(Continued)

OTHER PUBLICATIONS

Extended European Search Report dated Jul. 2, 2019 in Patent Application No. 19153731.5, 8 pages.
(Continued)

*Primary Examiner* — Timothy Kennedy
*Assistant Examiner* — Guy F Mongelli
(74) *Attorney, Agent, or Firm* — Grüneberg and Myers, PLLC

(57) ABSTRACT

A powder for solid freeform fabrication includes a first resin particle and a second resin particle, wherein MFR2 is greater than MFR1 and a ratio of MFR2 to MFR1 is from 2 to 5, where MFR1 represents a melt mass-flow rate (MFR) of the first resin particle and MFR2 represents a melt mass-flow rate of the second resin particle.

5 Claims, 8 Drawing Sheets

(51) Int. Cl.

| | |
|---|---|
| *B33Y 70/00* | (2020.01) |
| *C08J 3/12* | (2006.01) |
| *B29B 9/04* | (2006.01) |
| *B29B 9/16* | (2006.01) |
| *B29B 9/12* | (2006.01) |
| *B33Y 10/00* | (2015.01) |
| *B29K 105/00* | (2006.01) |
| *B33Y 30/00* | (2015.01) |
| *B29B 9/06* | (2006.01) |

(52) U.S. Cl.
CPC ............ *B29C 64/153* (2017.08); *B33Y 70/00* (2014.12); *C08J 3/12* (2013.01); *B29B 9/06* (2013.01); *B29K 2105/0094* (2013.01); *B29K 2105/251* (2013.01); *B33Y 10/00* (2014.12); *B33Y 30/00* (2014.12); *C08J 2367/02* (2013.01); *C08J 2467/02* (2013.01); *C08L 2205/025* (2013.01)

(58) Field of Classification Search
CPC . B29B 2009/125; B29C 64/153; B33Y 70/00; B33Y 10/00; B33Y 30/00; C08J 3/12; C08J 2367/02; C08J 2467/02; B29K 2105/0094; B29K 2105/251
See application file for complete search history.

(56) References Cited

U.S. PATENT DOCUMENTS

| | | | |
|---|---|---|---|
| 7,794,647 | B1 | 9/2010 | Deckard |
| 2003/0018408 | A1 | 1/2003 | Sagae et al. |
| 2006/0025526 | A1* | 2/2006 | Botros .................... C08L 23/10 525/240 |
| 2009/0291274 | A1* | 11/2009 | Tyagi .................... G03G 9/103 430/111.3 |
| 2011/0135814 | A1* | 6/2011 | Miyauchi ............... C12M 25/06 427/123 |
| 2011/0143108 | A1 | 6/2011 | Fruth et al. |
| 2013/0344282 | A1* | 12/2013 | Yagi ......................... C08K 7/04 428/113 |
| 2016/0160021 | A1 | 6/2016 | Kojima et al. |
| 2016/0177122 | A1 | 6/2016 | Naruse et al. |
| 2016/0236412 | A1 | 8/2016 | Kusahara et al. |
| 2016/0271877 | A1 | 9/2016 | Suzuki et al. |
| 2016/0271879 | A1 | 9/2016 | Yamashita et al. |
| 2017/0209927 | A1 | 7/2017 | Yamashita et al. |
| 2017/0217087 | A1 | 8/2017 | Tamoto et al. |
| 2017/0225404 | A1 | 8/2017 | Naruse et al. |
| 2018/0001520 | A1 | 1/2018 | Saito et al. |
| 2018/0022024 | A1 | 1/2018 | Saito et al. |
| 2018/0023219 | A1 | 1/2018 | Saito et al. |
| 2018/0147780 | A1 | 5/2018 | Kamoda et al. |
| 2018/0215917 | A1 | 8/2018 | Naruse |
| 2018/0264720 | A1 | 9/2018 | Tamoto et al. |
| 2018/0264721 | A1 | 9/2018 | Iida et al. |
| 2018/0273756 | A1 | 9/2018 | Saito et al. |
| 2018/0355144 | A1 | 12/2018 | Saito et al. |
| 2019/0119859 | A1 | 4/2019 | Bösterling et al. |
| 2020/0181385 | A1* | 6/2020 | Roberson ............... B29C 64/336 |

FOREIGN PATENT DOCUMENTS

| | | |
|---|---|---|
| EP | 3 482 901 A1 | 5/2019 |
| JP | H10-71636 | 3/1998 |
| JP | 2005301199 | 10/2005 |
| JP | 2007523774 | 8/2007 |
| JP | 2009-040870 | 2/2009 |
| JP | 2011-099023 | 5/2011 |
| JP | 2011-132274 A | 7/2011 |
| JP | 2018-15972 A | 2/2018 |
| JP | 2018-111304 A | 7/2018 |
| JP | 2018-154093 A | 10/2018 |
| JP | 2018-196983 | 12/2018 |
| JP | 2018-196984 | 12/2018 |
| JP | 2019-84815 A | 6/2019 |
| JP | 2019-84816 A | 6/2019 |
| JP | 2019-119162 A | 7/2019 |
| JP | 2019-135092 A | 8/2019 |
| WO | WO-2012078820 A2 * | 6/2012 ............ B41J 2/01 |
| WO | WO2017/112723 A1 | 6/2017 |

OTHER PUBLICATIONS

U.S. Appl. No. 16/056,855, filed Aug. 7, 2018, Takashi Fujita, et al.
U.S. Appl. No. 16/184,244, filed Nov. 8, 2018, Hitoshi Iwatsuki, et al.
Japanese Office Action dated Dec. 28, 2021 in Japanese Application No. 2018-122860, with English translation, 7 pages.

* cited by examiner

POWDER FOR SOLID FREEFORM FABRICATION AND METHOD OF MANUFACTURING SOLID FREEFORM FABRICATION OBJECT

CROSS-REFERENCE TO RELATED APPLICATIONS

This patent application is based on and claims priority pursuant to 35 U.S.C. § 119 to Japanese Patent Application Nos. 2018-019939 and 2018-122860, filed on Feb. 7, 2018 and Jun. 28, 2018, respectively, in the Japan Patent Office, the entire disclosures of which are hereby incorporated by reference herein.

BACKGROUND

Technical Field

The present invention relates to a powder for solid freeform fabrication, a device for manufacturing a solid freeform fabrication object, a method of manufacturing a solid freeform fabrication object, and a resin powder.

Description of the Related Art

A powder bed fusion (PBF) method is known as a method of manufacturing a solid freeform fabrication object (three-dimensional object). In this method, powder such as metal, an inorganic material, and a resin for solid freeform fabrication is laminated, and laminated layers are heated by a heat source or irradiated with light layer by layer or multiple layers by multiple layers to melt and fuse the powder in accordance with a predetermined form pattern, thereby forming a solid freeform fabrication object.

SUMMARY

According to embodiments of the present disclosure, provided is an improved powder for solid freeform fabrication which includes a first resin particle and a second resin particle, wherein MFR2 is greater than MFR1 and a ratio of MFR2 to MFR1 is from 2 to 5, where MFR1 represents a melt mass-flow rate (MFR) of the first resin particle and MFR2 represents a melt mass-flow rate of the second resin particle.

As another aspect of embodiments of the present disclosure, provided is an improved resin powder which includes a first resin particle and a second resin particle, wherein MFR2 is greater than MFR1 and a ratio of MFR2 to MFR1 is from 2 to 5, where MFR1 represents a melt mass-flow rate (MFR) of the first resin particle and MFR2 represents a melt mass-flow rate of the second resin particle.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1:
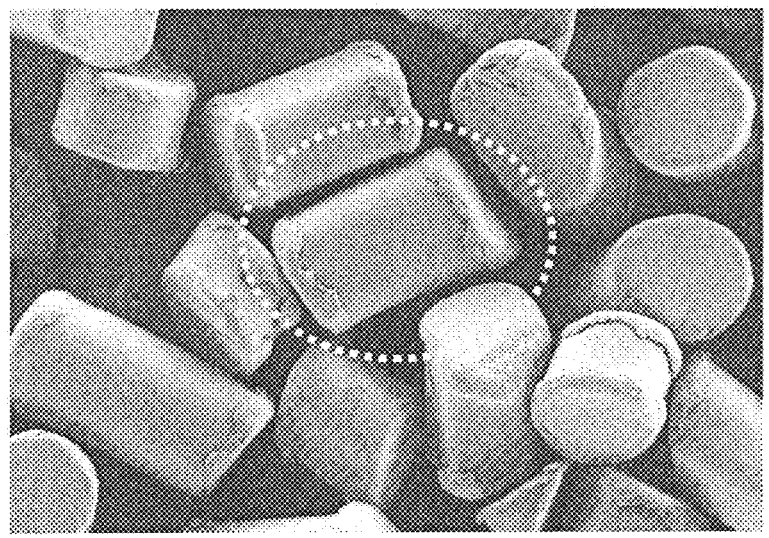
FIG. 1 is an image of powder for solid freeform fabrication taken by a scanning electron microscope (SEM)

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc. in the present disclosure represent the same meaning, unless otherwise specified.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

Powder bed fusion (PBF) methods are classified into selective laser sintering (SLS) method of forming a solid freeform fabrication object with selective irradiation of laser beams, selective mask sintering (SMS) method of forming a solid freeform fabrication object with two-dimensional irradiation of laser beams using a mask, high speed sintering (HSS) method of irradiating ink having a high level of thermal absorptivity using a heat source, and binder jetting (BJ) method of discharging a binder component to fabricate a fabrication object followed by sintering.

In these methods, the laminated powder particle for solid freeform fabrication is melted and fused to form a fabrication object. Resin flowability is a factor to be considered when the powder for solid freeform fabrication is melted. For example, a melted resin mixture of two kinds of resins has been proposed which has a melt flow rate as an index of flowability of a resin of from 0.5 to 200 g/10 minutes. In addition, a polymer has been proposed which has an intrinsic viscosity [η] of from 0.1 to 1.5 dl/g.

However, the methods mentioned above, flowability of the resin powder is just controlled, which does not strike a balance between dimension accuracy and strength of a fabrication object.

According to embodiments of the present disclosure, an improved powder for solid freeform fabrication can be provided which strikes a balance between the dimension accuracy and strength of a fabrication object.

The powder for solid freeform fabrication, the method of manufacturing a solid freeform fabrication object, a method of manufacturing a solid freeform fabrication object, and the resin powder relating to the present disclosure are described with reference to the accompany drawings. It is to be noted that the following embodiments are not limiting the present disclosure and any deletion, addition, modification, change, etc. can be made within a scope in which man in the art can conceive including other embodiments, and any of which is included within the scope of the present disclosure as long as the effect and feature of the present disclosure are demonstrated.

Powder for Solid Freeform Fabrication and Resin Powder

The powder for solid freeform fabrication according to the present disclosure includes a first resin particle and a second resin particle, wherein MFR2 is greater than MFR1 and the ratio of MFR2 to MFR1 is from 2 to 5, where MFR1 represents a melt mass-flow rate (MFR) of the first resin particle and MFR2 represents a melt mass-flow rate of the second resin particle.

The resin powder according to the present disclosure includes a first resin particle and a second resin particle, wherein MFR2 is greater than MFR1 and a ratio of MFR2 to MFR1 is from 2 to 5, where MFR1 represents a melt mass-flow rate (MFR) of the first resin particle and MFR2 represents a melt mass-flow rate of the second resin particle.

Notably, the powder for solid freeform fabrication of the present disclosure is included in the resin powder of the present disclosure and the descriptions of the powder for solid freeform fabrication of the present disclosure applies to the resin powder of the present disclosure, unless otherwise specified.

Melt Flow Rate (MFR)

Melt flow rate defined in the present disclosure is an index of viscosity (flowability) of a melted resin and is measured by an MFR measuring device (Type: D405913, manufactured by Dynisco LLC.) at 15 degrees C. higher than the melting point of the resin under a load of 2.16 kg according to JIS 7210 format (ISO 1133 regulation). A large MFR value means low viscosity during melting, that is, easy to flow, and a small MFR value means high viscosity during melting, that is, difficult to flow.

The ratio of MFR values (hereinafter, referred to as MFR ratio) is calculated by the following relation, where MFR1 means an MFR value of the first resin particle and MFR2 means an MFR value of the second resin particle.

MFR ratio=MFR2/MFR1

The smaller the ratio of the MFR value is, the smaller the difference is in melt viscosity between the first resin particle and the second resin particle. The larger the ratio, the larger the difference.

MFR value is a factor to be considered in the present disclosure as described below.

In the powder bed fusion (PBF) method, laminated solid freeform powder is irradiated with energy, such as laser beams, convertible to heat on the powder by a light source or a heat source in accordance with a particular print pattern, thereby melting and fusing the powder for solid freeform fabrication at the irradiated portion to form a solid freeform fabrication object. Therefore, it is appropriate to control viscosity of the melted resin.

Typically, controlling melt viscosity of a resin contained in powder for solid freeform fabrication is dominant. However, to enhance strength of a fabrication object, it is appropriate to sufficiently fill voids between particles for solid freeform fabrication and improve adhesion between particles. Therefore, appropriate flowability is required to fill the voids when the resin particles are melted.

Therefore, it is appropriate to lower viscosity of melted resin particles, but is difficult because a melt oozes out and overflows from the assumed form range, resulting in degradation of dimension accuracy. On the other hand, to enhance dimension accuracy, it is appropriate to increase melt viscosity. However, it is not possible to fill the voids among resin particles, which leads to degradation of fabrication strength. That is, it is difficult to strike a balance between dimension accuracy and strength of a fabrication object.

Therefore, if resin flowability during melting is increased to diminish voids in resin powder during melting, the resin melt overflows from the assumed form range because the resin melt has a low viscosity, resulting in degradation of dimension accuracy. Conversely, if resin flowability during melting is decreased to enhance dimension accuracy, voids among resin particles is not sufficiently filled because the resin melt is too viscous, resulting in degradation of fabrication strength.

The inventors of the present disclosure have found that the desired effect can be obtained when the ratio (MFR2/MFR1) of the MFR1 of the first resin particle to the MFR2 of the second resin particle is a predetermined value and thus made the present disclosure. Due to a combinational use of a resin particle (first resin particle) having a low flowability (high melt viscosity) and a resin particle (second resin particle) having a high flowability (low melt viscosity) in a desired range, particles having different melt viscosity are unevenly distributed in the fabrication object so that it is possible to strike a balance between dimension accuracy and strength.

More specifically, upon irradiation with light or a heat source, the first resin particle becomes a melt and starts being fused. However, by making the MFR ratio as described above, excessive flow can be prevented and writing sign (edge part of fabrication object) of light or a heat source can be sharpened.

Also, in typical technologies, the melt does not flow into the voids among the particles. Therefore, voids appear among the particles. However, in the present disclosure, the second resin particle, which has good flowability, penetrates into voids at the time of melting, so that the adhesion strength among the particles is improved and the strength of the fabrication object can be improved.

Since the melt viscosity of the resin varies depending on the power of light or a heat source, it is appropriate to take into account the melt viscosity ratio of the second resin particle to the first resin particle to demonstrate this effect. The MFR ratio is from 2 to 5 in the present disclosure. When the MFR ratio is less than 2, the melt viscosities of the first particle and the second resin particle are too close to sufficiently fill the voids. When the MFR ratio is greater than 5, melt viscosity of the second particle becomes too low if the power of light or a heat source to melt the first particle is increased. This causes degradation of accuracy. In addition, the MFR ratio is preferably from 3 to 4.

MFR of the first resin particle and the second resin particle can be controlled by selecting a resin grade constituting the particle and adding an additive such as a plasticizer to the resin.

Mass Ratio of First Resin Particle and Second Resin Particle

The powder for solid freeform fabrication of the present disclosure includes at least the first resin particle and the second resin particle. Also, it is appropriate to consider the mass ratio of the first resin particle and the second resin particle enhance the effect.

The mass ratio of the first resin particle to the second resin particle in the powder for solid freeform fabrication is preferably from 4:6 to 9.8:0.2 and more preferably from 5:5 to 9.5:0.5. When the mass of the first resin particle is within the above-mentioned range, it is possible to prevent deterioration of strength caused by the first resin particle with which the voids cannot be filled. In addition, when the mass of the second resin particle is within the above-mentioned range, it is possible to prevent deterioration of dimension accuracy caused by excessive oozing of the resin melt.

Average Volume Particle Diameter of First Particle and Second Particle

The volume average particle diameter Dv (μm) in the present disclosure can be measured under the conditions of corresponding resin refractive index, non-spherical, and air as solvent using a particle size distribution measuring device (microtrac MT3300 EXIT, manufactured by MicrotracBEL Corp).

In the present disclosure, the volume average particle diameter of the first resin particle and the second resin particle is also considered. The volume average particle diameter of the first resin particle is preferably larger than the volume average particle diameter of the second resin particle. This enhances accuracy and strength.

The volume average particle diameter of the first resin particle and the volume average particle diameter of the second resin particle are preferably from 5 to 200 μm and, in terms of dimension stability, more preferably from 20 to 100 μm. Within the above-mentioned range of the volume average particle diameter, it is furthermore preferable to set the particle diameter such that the volume average particle diameter of the first resin particle is larger than the volume average particle diameter of the second resin particle.

The ratio (Mv/Mn) of the volume average particle diameter My to the number average particle diameter Mn in the powder for solid freeform fabrication is preferably 2.00 or less, more preferably 1.50 or less, and particularly preferably 1.20 or less in terms of improvement of fabrication accuracy.

Form of First Resin Particle and Second Resin Particle

In the present disclosure, it is appropriate to consider the form of the first resin particle and the second resin particle. In particular, considering the form of the first resin particle is preferable. The first resin particle particularly preferably has a columnar form including a cylindrical form.

The columnar form has a first surface, a second surface, and a side surface in a scanning electron microscope (SEM) image taken by SEM (JSM-7800 FPRIME, manufactured by JEOL Ltd.) with a magnifying power of 150×. Also, in the area observed by the SEM, the outer peripheral area of the first surface and the second surface of the outer peripheral area are entirely stretching along the side surface.

When columnar first resin particles are laminated by a 3D printer, packing density of the powder is high, so that a fabrication object having a greater strength can be obtained.

Notably, the second resin particle preferably has a non-columnar form if the first resin particle has a columnar form.

The first resin particle having a columnar form is, for example, when the first resin particle having a columnar form accounts for 95 percent or more in number of around 30 particles observed in an SEM image. This applies to the other forms and is also true to the second resin particle.

Figure 2:
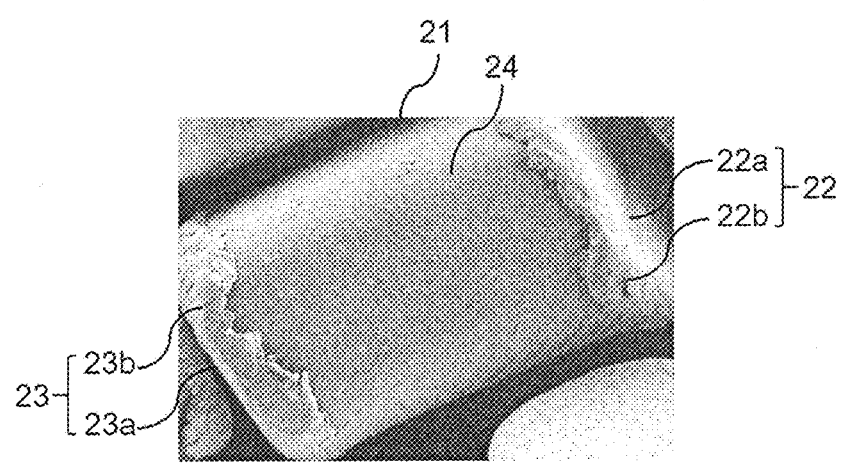
FIG. 2 is a diagram of an enlarged view of a part of the SEM image illustrated in FIG. 1.

An example of the columnar form is described with reference to FIGS. 1 and 2. FIG. 1 and FIG. 2 are photographs by scanning electron microscope (SEM) observation. FIG. 1 illustrates resin particles having columnar forms and FIG. 2 is a photograph illustrating an enlarged view of the particle enclosed by a dotted circle in FIG. 1. The first resin particle and the second resin particle are described without distinction.

As illustrated in FIG. 2, a column 21 includes a first surface 22, a second surface 23, and a side surface 24. The first surface 22 includes a first opposing surface 22a and a first perimeter area 22b having a form stretched along the side surface 24. The perimeter area 22b of the first area 22 is a continuous surface with the first opposing surface 22a via a curved surface and substantially orthogonal to the first opposing surface 22a.

The second surface 23 includes a second opposing surface 23a facing the first opposing surface 22a and a second perimeter area 23b having a form stretched along the side surface 24. The second perimeter area 23b is a continuous surface with the second opposing surface 23a via a curved surface and substantially orthogonal to the second opposing surface 23a. The side surface 24 is adjacent to the first surface 22 and the second surface 23.

In addition, the first perimeter area 22b and the second perimeter area 23b are stretched on the side surface 24. The form of the perimeter area 22b of the first surface 22 and the perimeter area 23b of the second surface 23 (both of which are hereinafter also referred to as perimeter area) is at least distinguishable from the side surface 24 in a scanning electron microscope (SEM) image. For example, a form of the perimeter area partially integrated with the side surface 24, a form of the perimeter area adjacent to the side surface 24, a form having a space between the perimeter area and the side surface 24 are allowed.

In addition, the first perimeter area 22b and the second perimeter area 23b are preferably provided along the surface direction substantially identical to the surface direction of the side surface 24.

As illustrated in FIG. 2, the first perimeter area 22b and the second perimeter area 23b stretch along the side surface 24 and are situated thereon in this embodiment.

In addition, the structure of the first surface 22 and the second surface 23 covering around the connection area of the perimeter area 22b of the first surface 22 and the perimeter area 23b of the second surface 23 and the side surface 24 is also referred to as a bottle cap-like form. The columnar form includes this bottle cap-like form.

In the present disclosure, the first perimeter area 22b and the second perimeter area 23b mean the area of the column 21 in the area observed by scanning electron microscope (SEM). That is, the area of the column 21 in the area not observed by the SEM is not included in the first perimeter area 22b and the second perimeter area 23b.

In the present disclosure, the first perimeter area 22b having a form stretched along the side surface 24 means that all (but limited to the area observed by SEM) of the first perimeter area 22b stretches along the side face 24, and does not include the first perimeter area 22b partially stretching along the side face 24.

In the present disclosure, the second perimeter area 23b having a form stretched along the side surface 24 means that all (but limited to the area observed by SEM) of the second perimeter area 23b stretches along the side face 24, and does not include the second perimeter area 22b partially stretching along the side face 24.

In the present embodiment, the first perimeter area 22b and the second perimeter area 23b respectively have forms of the first surface 22 and the second surface 23 stretching along the side surface 24. Therefore, the first perimeter area 22b and the first opposing surface 22a and the second perimeter area 23b and the second opposing surface 23a smoothly continue via curved surfaces.

Due to the first perimeter area 22b and the second perimeter area 23b, the column 21 is free of a corner (pointed) portion. Therefore, the packing density of powder for solid freeform fabrication including the column 21 can be increased, thereby enhancing the tensile strength of an obtained solid freeform fabrication object.

Further, due to the column 21 without a corner portion, flowability of powder for solid freeform fabrication including the column 21 can be enhanced, so that poor moving of the powder for solid freeform fabrication during solid freeform fabrication can be reduced, thereby enhancing the tensile strength of an obtained solid freeform fabrication object.

"Without a corner portion" is described in detail below referring to specific examples.

The resin particle having a significantly cylindrical form has a base (first surface 22) and an upper surface (second surface 23). Preferable forms do not have a point at ends in terms of increasing bulk density. The point means an angle portion existing in the column 21.

Figure 7:
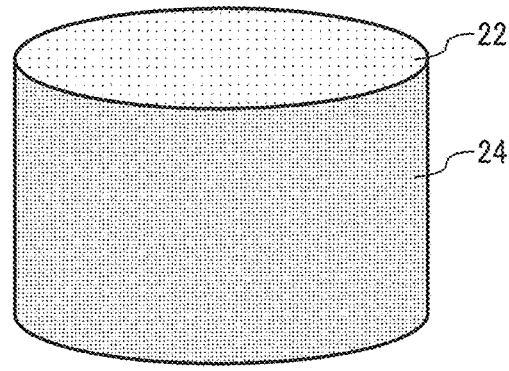
FIG. 7 is a diagram illustrating a schematic perspective view of an example of a cylindrical form.
Figure 8:
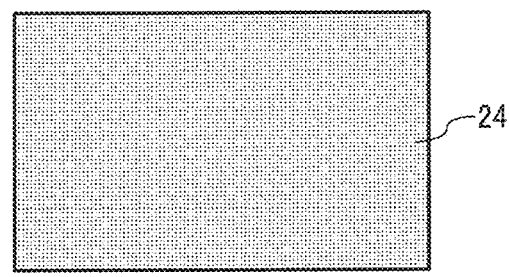
FIG. 8 is a diagram illustrating a side view of the cylindrical form illustrated in FIG. 7.
Figure 9:
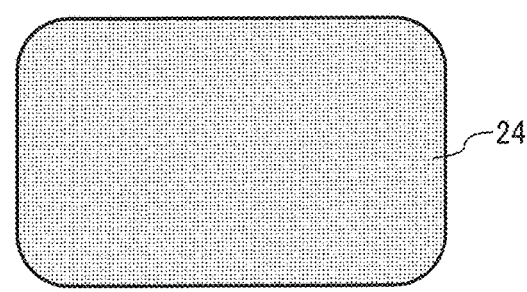
FIG. 9 is a diagram illustrating a side view of an example of a cylindrical form with no points at ends.
Figure 10:
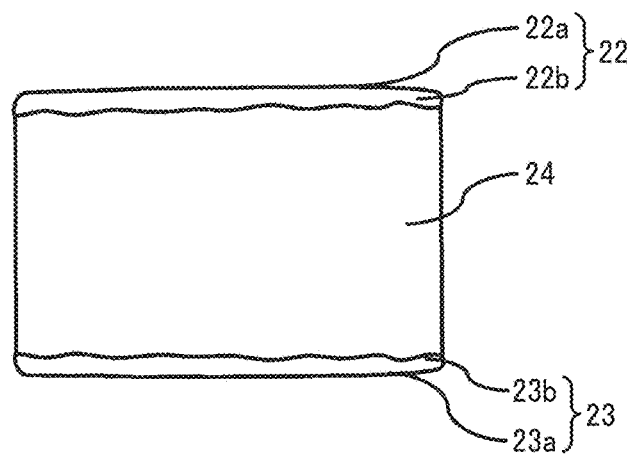
FIG. 10 is a diagram illustrating a side view of another example of a cylindrical form with no points at ends.
Figure 11:
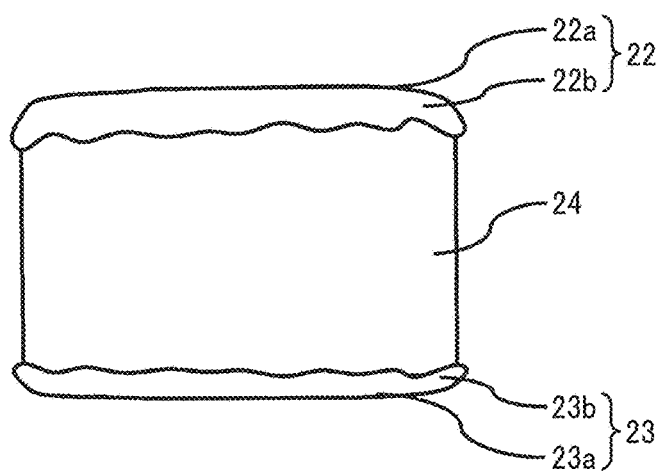
FIG. 11 is a diagram illustrating a side view of another example of a cylindrical form with no points at ends.
Figure 12:
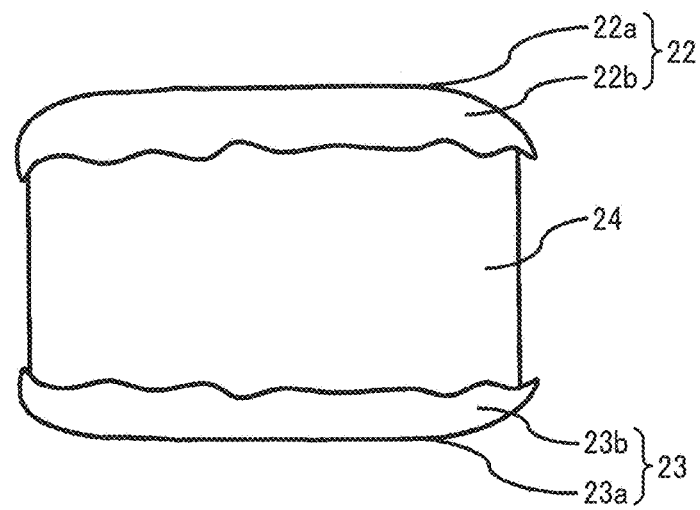
FIG. 12 is a diagram illustrating a side view of another example of a cylindrical form with no points at ends.
Figure 13:
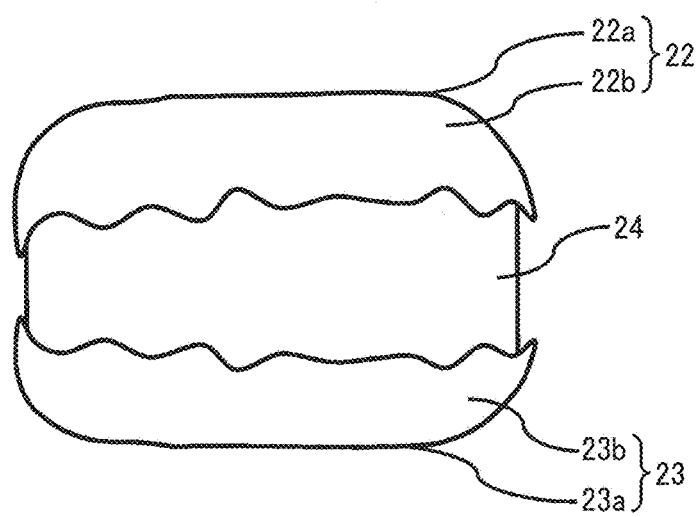
FIG. 13 is a diagram illustrating a side view of another example of a cylindrical form with no points at ends.
Figure 14:
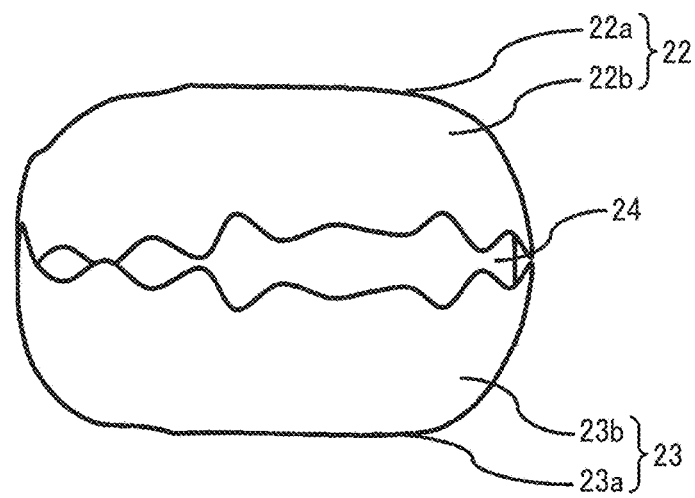
FIG. 14 is a diagram illustrating a side view of another example of a cylindrical form with no points at ends.
Figure 15:
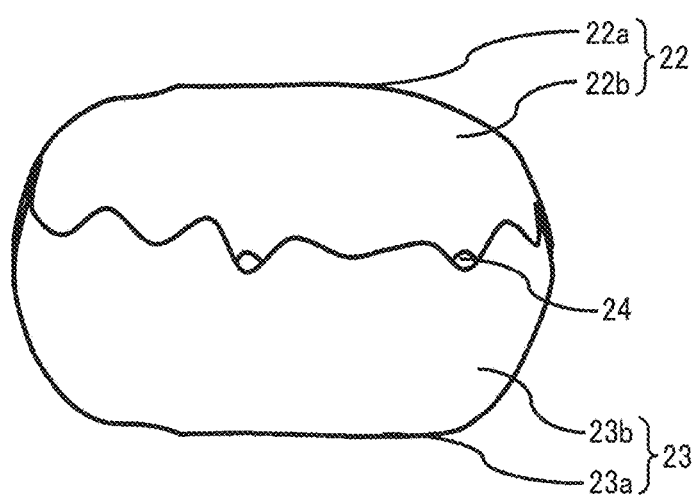
FIG. 15 is a diagram illustrating a side view of another example of a cylindrical form with no points at ends.

The form of the column 21 (columnar particle) is described with reference to FIGS. 7 to 15. FIG. 7 is a diagram illustrating a schematic perspective view of an example of a cylindrical form. FIG. 8 is a diagram illustrating a side view of the cylindrical form illustrated in FIG. 7. FIG. 9 is a diagram illustrating a side view of an example of a cylindrical form with no points at ends. FIGS. 10 to 15 are schematic diagrams illustrating side views of other examples of the cylindrical form with no points at ends.

As the cylindrical form illustrated in FIG. 7 is observed from the side, the form is rectangular as illustrated in FIG. 8. It has angle portions, i.e., four points. Examples of the form with no points at ends are illustrated in FIGS. 9 to 15.

Whether a cylindrical form has a point can be confirmed by a projected image from the side plane of the columnar particle. For example, the side of a cylindrical particle is observed by a scanning electron microscope (S4200, manufactured by Hitachi Ltd.), etc. to acquire a two-dimensional image. In this case, the projected image has four sides. When the portion formed of each of two adjacent sides is defined as an end part, if the end part is formed of only two adjacent straight lines, an angle is formed and the particle has a point. If the end part is are as illustrated in FIGS. 9 to 15, no point is formed at the end portion.

In addition, the column 21 having a form in which all of the first perimeter area 22b and all of the second perimeter area 23b existing at least in the observation area by SEM stretch along the side surface 24 can demonstrate sufficient packing density and flowability required as the powder for solid freeform fabrication.

The first perimeter area 22b and the second perimeter area 23b are formed such that the length of the shortest portion in the height direction of the column 21 is preferably 1 μm or more, more preferably 3 μm or more, and furthermore preferably 5 μm or more. When the shortest length is 1 μm or more, the curved surface between the first opposing surface 22a and the first peripheral area 22b and the curved surface between the second opposing surface 23a and the second peripheral area 23b are more smooth, thereby increasing the packing density of the powder for solid freeform fabrication including the column 21 and enhancing the tensile strength of an obtained solid freeform fabrication object.

Further, when the curved surface is more smooth, flowability of powder for solid freeform fabrication including the column 21 can be enhanced, so that poor moving of the powder during solid freeform fabrication can be reduced, thereby enhancing the tensile strength of an obtained solid freeform fabrication object.

The first peripheral area 22b and the second peripheral area 23b preferably have a maximum length of 10 μm or more and more preferably 15 μm or more along the height direction of the column 21.

Both lengths are determined in the observation area by SEM.

The form of the column 21 is not particularly limited and can be suitably selected to suit to a particular application. Examples are solid forms such as substantially cylindrical forms and substantially prismatic forms. Substantially prismatic forms are preferable. The substantially cylindrical forms and substantially prismatic forms include solid forms having the first peripheral area 22b and the second peripheral area 23b.

The forms of the first opposing surface 22a and the second opposing surface 23a in the column 21 are determined depending on the form of the column 21. For example, in a case where a line (corner) in the height direction of the column 21 is not observed while a smooth surface is uniformly observed, the column 21 is substantially cylindrical and the first opposing surface 22a and the second opposing surface 23a are substantially circular. For example, in a case where multiple surfaces segmented by a line (corner) in the height direction of the column 21 is observed, the column 21 is substantially prismatic and the first opposing surface 22a and the second opposing surface 23a are substantially polygonal.

As described above, the column 21 has the first opposing surface 22a and the second opposing surface 23a opposing each other. The first opposing surface 22a may be slanted against the second opposing surface 23a. However, the first opposing surface 22a and the second opposing surface 23a are preferably substantially parallel to each other. Both being substantially parallel to each other improves flowability of the powder for solid freeform fabrication including the column 21.

The ratio of the maximum length of the straight line drawn in the first opposing surface 22a or the second opposing surface 23a of the column 21 to the height of the column 21 is from 0.5 to 5.0, more preferably from 0.7 to 2.0, and furthermore preferably from 0.8 to 1.5.

Figure 3:
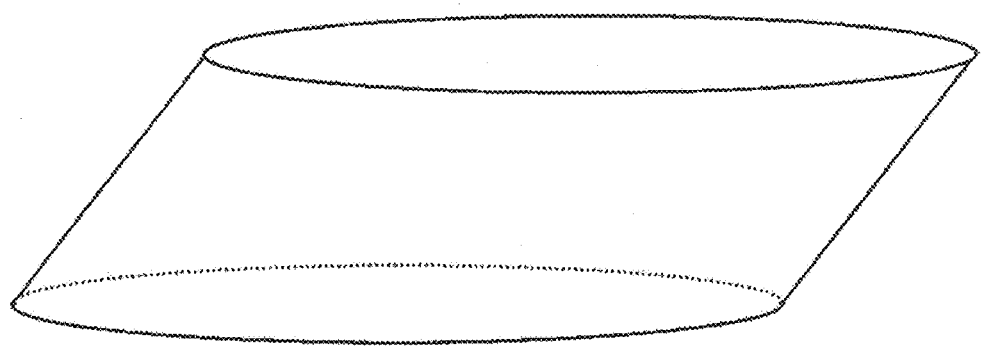
FIG. 3 is a schematic diagram illustrating an example of a cut article formed by cutting a resin having a cylindrical form in a diagonal direction.

FIG. 3 is a schematic diagram illustrating an example of a cut article formed by cutting a resin particle having a cylindrical form in a diagonal direction. As illustrated in FIG. 3, the surface directions of the first opposing surface 22a and the second opposing surface 23b are not necessarily perpendicular to the surface direction of the side surface 24. That is, the column 21 includes such a resin particle having the surface directions of the top and the bottom not perpendicular to the surface direction of the side.

Resin for First Resin Particle and Second Resin Particle

As the resin for the first resin particle and the second resin particle in the present disclosure, a thermoplastic resin can be used. The thermoplastic resin is not particularly limited. Crystalline resin and liquid crystal resin (LCP) are preferable. In particular, a resin having a large difference between the melting start temperature and the recrystallization point at the time of cooling is preferable.

Specific examples of the crystalline resin include, but are not limited to, polymers such as polyolefin, polyamide, polyester, polyether, polyphenylene sulfide, polyacetal, and thermoplastic polyimide. These may be used singly or in combination of two or more kinds and may be used as an alloy. It is preferable to use the same kind of resin as the first resin particle and the second resin particle. The same kind of resin means that, for example, if the first resin is polyolefin, the second resin is also polyolefin. Also, if the first resin is polyolefin and the second resin is not polyolefin but polyester, the first resin and the second resin are not the same kind of resins in this case. When the first resin particle and the second resin particle are not the same kind of resin, the melting point is different, one of the resins does not melt or the compatibility between the first resin particles and the second resin particles is low, which will not lead to enhancement of strength.

Specific examples of the polyolefine include, but are not limited to, polyethylene and polypropylene (PP, melting point of 180 degrees C.).

Specific examples of the polyamide include, but are not limited to, polyamide 410 (PA410), polyamide 6 (PA6), polyamide 66 (PA66, melting point of 265 degrees C.), polyamide 610 (PA610), polyamide 612 (PA612), polyamide 11 (PA11), polyamide 12 (PA12), semi-aromatic polyamide 4T (PA4T), polyamide MXD6 (PAMXD6), polyamide 6T (PA6T), polyamide 9T (PA9T, melting point of 300 degrees C.), and polyamide 10T (PA10T). PA9T is also referred to as polynonamethylene terephthal amide, constituted of a diamine having 9 carbon atoms and a terephthalic acid monomer. In general, since the carbon acid side is an aromatic series, PA9T is referred to as semi-aromatic series. Moreover, the polyamide in the present disclosure includes aramid, constituted of p-phenylenediamine and a terephathalic acid monomer as aromatic series in which the diamine side is also aromatic.

Specific examples of the polyester include, but are not limited to, polyethyleneterephthalate (PET, melting point of 260 degrees C.), polybutadiens terephthalate (PBT, melting point of 218 degrees C.), and polylactic acid (PLA). To impart heat resistance, polyester including aromatic series partially including terephthalic acid and isophthalic acid is also suitably used in the present disclosure.

Specific examples of the polyether include, but are not limited to, polyether etherketone (PEEK, melting point of 343 degrees C.), polyetherketone (PEK), polyether ketone ketone (PEKK), polyaryl ether ketone (PAEK), polyether ether ketone ketone (PEEKK), and polyetherkeone ether ketone ketone (PEKEKK).

In addition to the polyether mentioned above, crystalline polymers are also suitable. Specific examples include, but are not limited to, polyacetal, polyimide, and polyether sulfone. Polyamide having two melting point peaks such as PA9T may be used.

In the present disclosure, the thermoplastic resin is plasticized and melted upon application of heat. Of the thermoplastic resins, crystalline resins are preferable. The crystalline resin has a melting peak as measured according to ISO 3146 regulation (plastic transition temperature measuring method, JIS K7121 format).

A crystal-controlled crystalline thermoplastic resin is preferable as the crystalline resin. Of these, a crystalline thermoplastic resin having a crystal size and a crystal alignment controlled by a method of external stimuli such as heat, drawing, crystal nuclear material, ultrasonic treatment is more preferable.

There is no specific limitation to the method of forming the crystalline thermoplastic resin and it can be selected to suit to a particular application. For example, to enhance crystallinity, annealing treatment of heating a resin at temperatures equal to or higher than the glass transition temperature of the resin is suitable. To further enhance crystallinity, a crystal nucleating agent may be added before the annealing treatment.

Also, a method of applying ultrasonic rays to enhance crystallinity, a method of dissolving a resin in a solvent and slowly evaporating the solvent to enhance crystallinity, a method of applying an external electric field to grow crystal or drawing and thereafter subjecting the thus-obtained highly-oriented or highly-crystallized article to a process such as pulverization, cutting, etc. are suitable.

For the annealing, the resin is heated at a temperature 50 degrees C. higher than the glass transition temperature thereof for three days and thereafter slowly cooled down to room temperature.

Melt liquid for solid freeform fabrication is drawn (stretched) into a fibrous form using an extruder during stirring at temperatures 30 degrees C. or greater higher than the melting point. The melt is preferably extended (stretched) to approximately 1/1 to approximately 1/10 to obtain fibers. The maximum extension ratio can be changed depending on resin and melt viscosity.

In the application of ultrasonic rays, glycerin (reagent grade, manufactured by Tokyo Chemical Industry Co. Ltd.) solvent is added to a resin in an amount of five times as much as the resin followed by heating to a temperature 20 degrees C. higher than the melting point. Thereafter, ultrasonic wave is applied thereto by an ultrasonic generator (ultrasonicator UP200S, manufactured by Hielscher Ultrasonics GmbH) at a frequency of 24 kHz and an amplitude of 60 percent for two hours. Thereafter, the resultant is rinsed with a solvent of isopropanol at room temperature preferably followed by vacuum drying.

In the external electric field application, after heating a resin at the glass transition temperature or higher, an alternative electric field (500 Hz) of 600 V/cm is applied thereto for one hour followed by slow cooling down.

In the powder bed fusion (PBF) method, a large temperature width (temperature window) about crystal layer change is preferable to prevent warping occurring during manufacturing of a solid freeform fabrication object. It is preferable that the crystal layer change be larger because resin powder having a large difference between the melting starting temperature and the recrystallization point during cooling has better fabrication property.

Other Additive

Additives such as a flame retardant, a plasticizer, a thermal stability additive, and a crystal nucleating agent and polymer particles of a non-crystalline resin can be contained in or separately added to the particle unless those have an adverse impact.

Method of Manufacturing Powder for Solid Freeform Fabrication

The first resin particle and the second resin particle are separately manufactured and thereafter mixed to obtain the powder for solid freeform fabrication of the present disclosure. These resin particles can be mixed by a known method, for example, using a mixer or a shaker.

A commercially available resin is subjected to powder processing by a known method to obtain the first resin particle and the second resin particle. For example, known methods include a method of pulverizing resin pellets and powders at a room temperature or freezing temperature environment, an atomizing method of jetting resin after melting, a suspension method, etc. In addition, it is also possible to classify the obtained particles so as to obtain a desired particle size and particle size distribution suited to a particular application.

Hereinafter, the powder containing the first resin particle is also referred to as first particle powder and the powder containing the second resin particle is also referred to as second particle powder.

To obtain a powder having a substantially columnar form, for example, a method of cutting out a resin fiber to directly obtain a substantially cylindrical form or a rectangular parallelepiped form, a method of obtaining a rectangular parallelepiped powder or a cubic powder from a film form, a method of post-processing obtained rectangular parallelepiped powder to obtain a powder having a substantially cylindrical form can be utilized. Of these, the method of cutting out a resin fiber is preferable.

For example, resin melt for solid freeform fabrication is drawn (stretched) into fibrous form using an extruder during stirring at temperatures 30 degrees C. or greater higher than the melting point to prepare the resin fiber. The resin melt for solid freeform fabrication is stretched to approximately 1/1 to approximately 1/10 to obtain fiber. The form of the cross section of the fiber depends on the form of the nozzle orifice of the extruder. For example, if the cross section is set to be circular, circular nozzle orifices are preferable.

It is preferable that the dimension accuracy is higher. The circular form of a surface portion is at least 10 percent or less at radius. Productivity increases in proportion to the number of nozzles.

For cutting, a cutting machine employing guillotine method in which both the upper edge and the lower edge are blades or a cutting machine employing a straw cutter method of cutting with an upper edge with a board disposed on the bottom side instead of a blade can be used. Such a device or $CO_2$ laser, etc. is used to directly cut the fiber to 0.005 to 0.2 mm. The powder of the present disclosure can be directly obtained by those methods.

To obtain resin powder for solid freeform fabrication under another suitable condition, it is preferable to sinter every time a powder layer is formed by a roller, etc. In the sintering process, the powder layer is selectively melted. A powder layer is formed on the previously formed layer and selectively melted again. This operation is repeated until a target solid freeform fabrication object is manufactured.

Usage of Powder for Solid Freeform Fabrication

The powder for solid freeform fabrication of embodiments of the present disclosure can be suitably used in selective laser sintering (SLS) method, selective mask sintering (SMS) method, high speed sintering (HSS) method, binder jetting (BJ) method, etc.

Usage of Resin Powder

The resin powder of embodiments of the present disclosure strikes a balance between parameters such as granularity, particle size distribution, heat transfer properties, melt viscosity, bulk density, flowability, melting temperature, and recrystallization temperature. This resin powder is suitably used in methods for solid freeform fabrication using resin powder such as SLS method, SMS method, multi jet fusion (MJF) method, BJ method, etc. The resin powder of the present embodiment can be suitably applied to surface modifying agents, spacers, lubricants, paints, grind stone, additives, secondary battery separator, foods, cosmetics, and cloths. In addition, it can be used as material or metal substitution material for use in fields such as auto mobiles, precision devices, semiconductor, aerospace, and medicines.

Device for Manufacturing Solid Freeform Fabrication Object

A device for manufacturing a solid freeform fabrication object according to the present disclosure includes a supply tank accommodating the above-mentioned powder for solid freeform fabrication, a layer forming device to form a layer containing the powder for solid freeform fabrication, a melting device to at least partially melt the layer, and other optional devices.

Examples of the layer forming device include rollers, blades, brushes, etc., or combinations thereof.

The melting device applies electromagnetic rays to melt the layer. Examples of the electromagnetic ray generator for use in the melting device are $CO_2$ lasers, infra red irradiation sources, microwave generators, radiant heaters, LED lamps, and combinations thereof.

Figure 4:
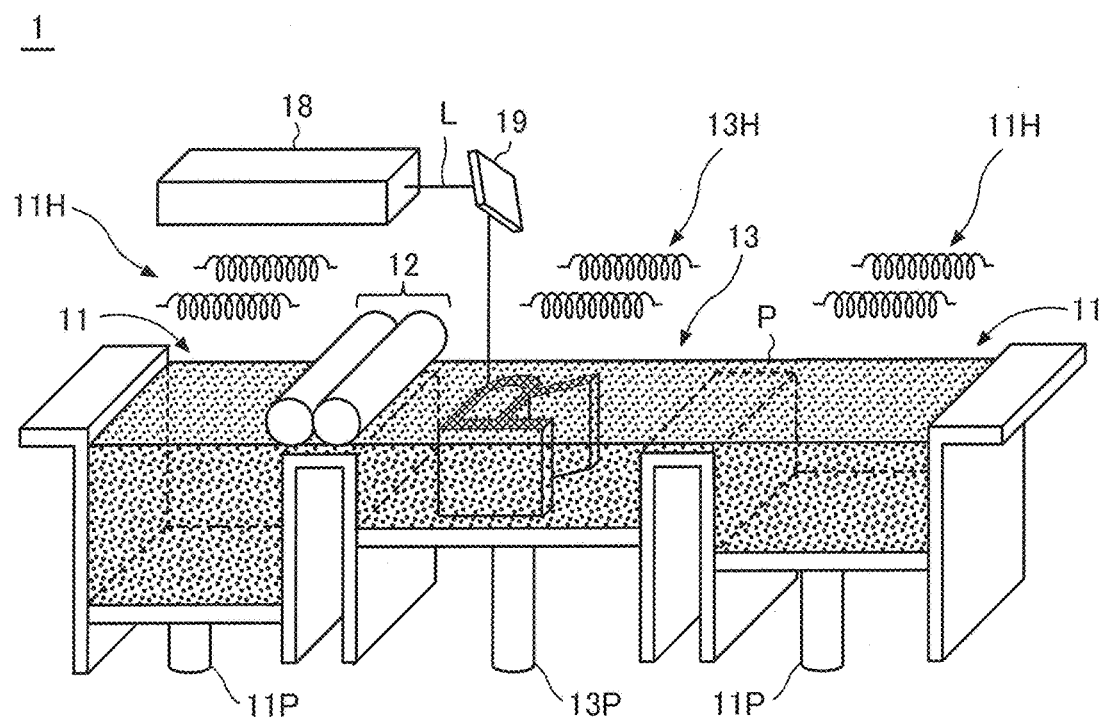
FIG. 4 is a schematic diagram illustrating an example of the device for manufacturing a solid freeform fabrication object according to an embodiment of the present disclosure.

The device for manufacturing a solid freeform fabrication object with the powder for solid freeform fabrication is described with reference to FIG. 4. FIG. 4 is a schematic diagram illustrating the device for manufacturing a solid freeform fabrication object according to an embodiment of the present disclosure.

As illustrated in FIG. 4, a solid freeform fabrication device 1 includes a supply tank 11 as an example of the accommodating device to accommodate resin powder P for fabrication, a roller 12 to supply the resin powder P accommodated in the supply tank 11, a laser scanning space 13 where the resin powder P supplied by the roller 12 is disposed and scanned with a laser L, an electromagnetic ray irradiation source 18 as the irradiation source of the laser L as electromagnetic rays, and a reflection mirror 19 to reflect the laser L emitted from the electromagnetic ray irradiation source 18 to a determined position on the laser scanning space 13. In addition, the solid freeform fabrication device 1 further includes heaters 11H and 13H to respectively heat the resin powder P in the supply tank 11 and the resin powder P accommodated in the laser scanning space 13.

The reflection surface of the reflection mirror 19 moves based on two-dimensional data of a three-dimensional (3D) model while the electromagnetic ray irradiation source 18 emits the laser L. The two dimensional data of the 3D model represents each cross section form obtained when a 3D model is sliced with a predetermined interval. When the reflection angle of the laser L changes, the portion indicated by the two-dimensional data in the laser scanning space 13 is selectively irradiated with the laser L. The resin powder at the laser L irradiation position melts and fuses. That is, the electromagnetic ray irradiation source 18 serves as a melting device to melt the resin powder P.

In addition, the supply tank 11 and the laser scanning space 13 of the solid freeform fabrication device 1 respectively includes pistons 11P and 13P. The pistons 11P and 13P respectively move the supply tank 11 and the laser scanning space 13 up or down along the lamination direction of the fabrication object at the completion of layer fabrication. Due to this, fresh resin powder P for use in fabrication of a layer can be supplied from the supply tank 11 to the laser scanning space 13.

The solid freeform fabrication device 1 changes the irradiation position of the laser by the reflection mirror 19 to selectively melt the resin powder P. The present disclosure is not limited thereto. The resin powder of the present disclosure can be suitably used in a fabrication device employing selective mask sintering (SMS) method. In the SMS method, for example, resin powder is partially masked by a shielding mask and the unmasked portion is irradiated with electromagnetic rays such as infrared rays so that the resin powder is selectively melted to obtain a fabrication object.

In the case of using the SMS process, the resin powder P preferably contains at least one of a heat absorbent, dark material, etc. to reinforce infrared absorbability. Examples of the heat absorbent or the dark material are carbon fiber, carbon black, carbon nano tube, and cellulose nano fiber.

The SMS process suitably usable is described in, for example, the specification of U.S. Pat. No. 6,531,086.

Method of Manufacturing Solid Freeform Fabrication Object

The method of manufacturing a solid freeform fabrication object (3D modeling object) includes forming a layer containing the powder for solid freeform fabrication, at least partially melting the layer, and repeating the forming a layer and the melting the layer. The method may further optionally include other processes.

The layer can be formed by, for example, a roller, a blade, a brush, or a combination thereof.

The layer can be melted with, for example, electromagnetic ray irradiation source such as $CO_2$ laser beams, an infra red irradiation source, a microwave generator, a radiant heater, an LED lamp, and a combination thereof.

FIGS. 5 and 6 are conceptual diagrams illustrating an embodiment of the method of manufacturing a solid freeform fabrication object of the present disclosure. The method of manufacturing a solid freeform fabrication object using the solid freeform fabrication device 1 is described with reference to FIGS. 5 and 6.

The heater 11H applies heat to the resin powder P accommodated in the supply tank 11. The temperature of the supply tank 11 is preferably as high as possible but not higher than the melting point of the resin particle P to reduce warp which occurs during melting ascribable to laser irradiation. However, to prevent melting of the resin powder P in the supply tank 11, the temperature is preferably at least 10 degrees C. lower than the melting point of the resin powder P.

Figure 5A:
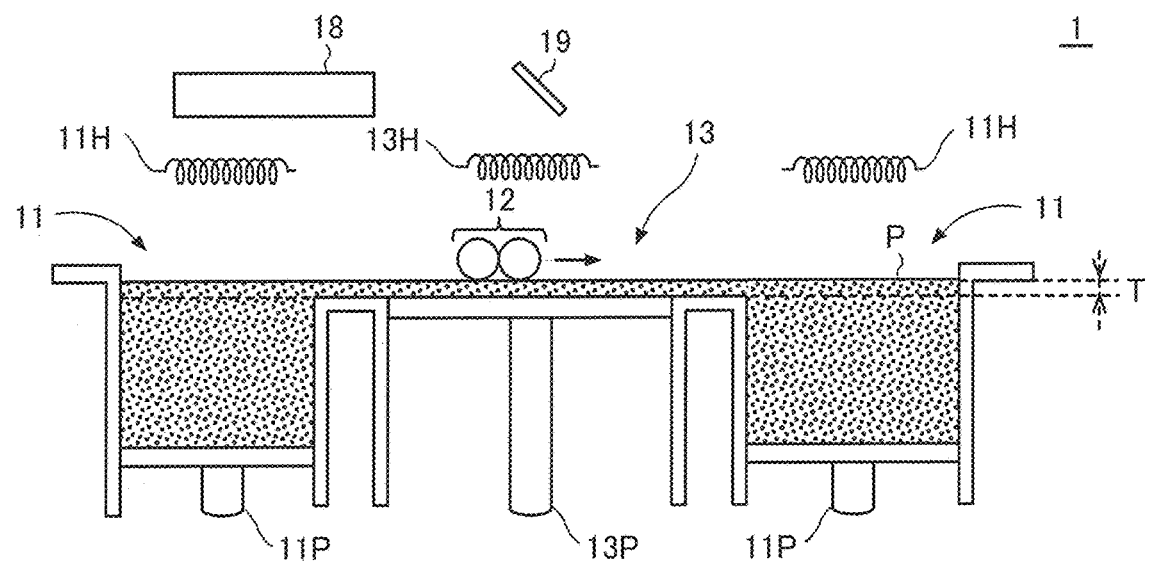
FIGS. 5A and 5B are diagrams illustrating an example of the method of manufacturing a solid freeform fabrication object according to an embodiment of the present disclosure.

As illustrated in FIG. 5A, as one example of the supply process, the engine of the solid freeform fabrication device 1 drives the roller 12 to supply the resin powder P in the supply tank 11 to the laser scanning space 13 and level the laser scanning space 13, thereby forming a powder layer having a thickness of T corresponding to the thickness of a single layer. The heater 13H applies heat to the resin powder P supplied to the laser scanning space 13. The temperature of the laser scanning space 13 is preferably as high as possible in order to reduce warp occurring during melting due to laser irradiation but at least 5 degrees C. lower than the melting point of the resin particle P to prevent melting of the resin powder P at the laser scanning space 13.

Figure 5B:
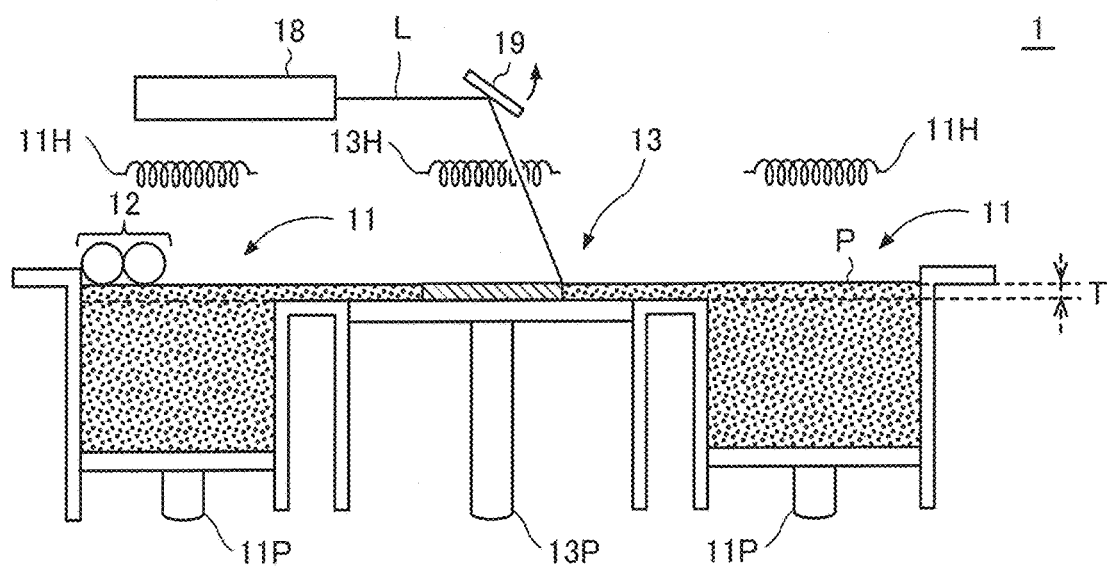

The engine of the solid freeform fabrication device 1 receives input of multiple two-dimensional data created from the 3D model. As illustrated in FIG. 5B, the engine of the solid freeform fabrication device 1 causes the electromagnetic ray irradiation source 18 to emit laser beams while moving the reflection surface of the reflection mirror 19 based on the two dimensional data for the part closest to the base of a fabrication object. The power of the laser has no particular limit and can be suitably selected to suit to a particular application. For example, it is preferably from 10 to 150 W.

Due to the irradiation of the laser, of the powder layers, the resin powder P positioned corresponding to the pixel indicated by the two dimensional data for the part closest to the base of a fabrication object is melted. At the completion of the laser irradiation, the melted resin cures to form a sintered layer having a form in accordance with the two dimensional data for the part closest to the base of a fabrication object.

The thickness T of the sintered layer has no particular limit. For example, the average of the thickness T is preferably 10 μm or greater, more preferably 50 μm or greater, and furthermore preferably 100 μm or greater. The thickness T of the sintered layer has no particular limit. For example, the average is preferably less than 200 μm, more preferably less than 150 μm, and furthermore preferably less than 120 μm.

Figure 6A:
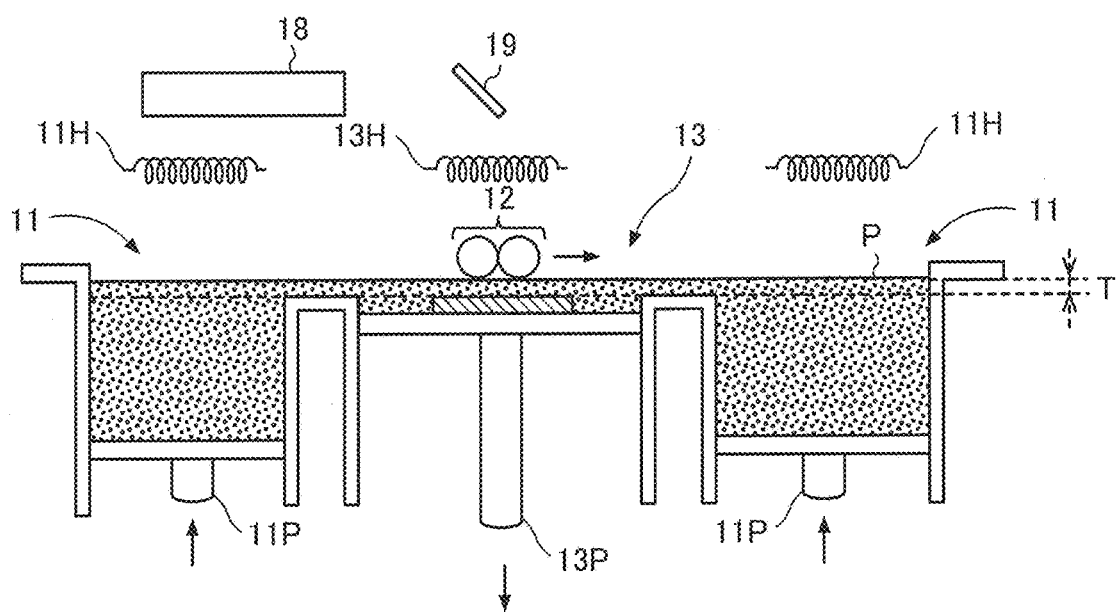
FIGS. 6A and 6B are diagrams illustrating another example of the method of manufacturing a solid freeform fabrication object according to an embodiment of the present disclosure.

As illustrated in FIG. 6A, at the forming of the sintered layer closest to the base, the engine of the solid freeform fabrication device 1 lowers the laser scanning space 13 in an amount corresponding to the thickness T corresponding to the thickness of a single layer by the piston 13P to form a fabrication space having a thickness T on the laser scanning space 13. In addition, the engine of the solid freeform fabrication device 1 elevates the piston 11P to supply fresh resin powder P. Thereafter, the engine of the solid freeform fabrication device 1 drives the roller 12 to supply the resin powder P in the supply tank 11 to the laser scanning space 13 and level the laser scanning space 13, thereby forming a powder layer having a thickness of T corresponding to the thickness of a single layer.

Figure 6B:
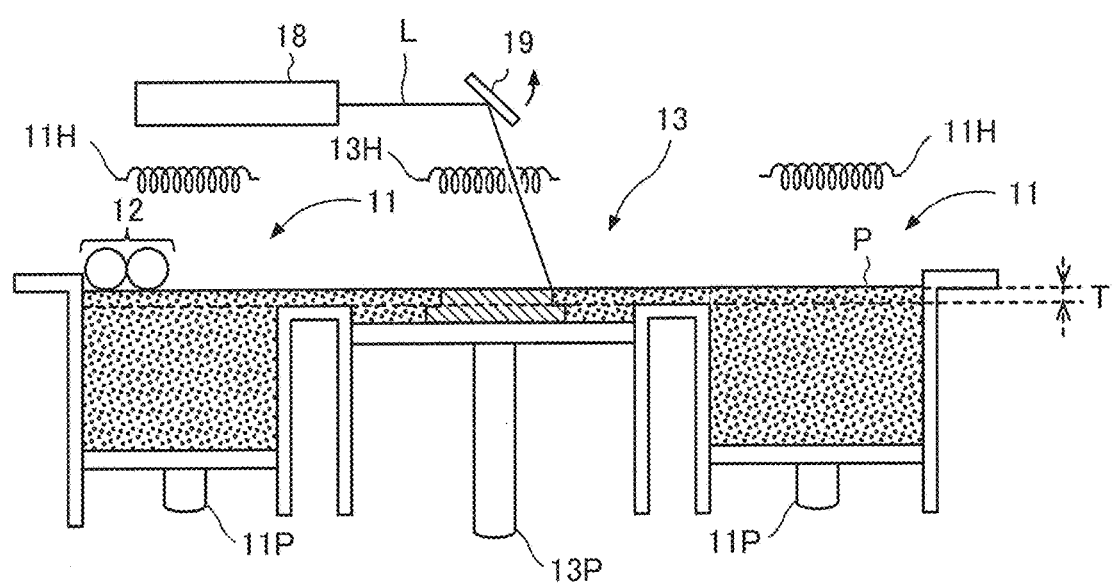

As illustrated in FIG. 6B, the engine of the solid freeform fabrication device 1 causes the electromagnetic ray irradiation source 18 to emit laser beams while moving the reflection surface of the reflection mirror 19 based on the two dimensional data for the layer second closest to the base of the multiple two-dimensional data. Due to the irradiation of the laser, of the powder layers, the resin powder P positioned corresponding to the pixel indicated by the two dimensional data for the layer second closest to the base is melted. At the completion of the laser irradiation, the melted resin cures to form and laminate the sintered layer having a form of the two-dimensional data for the layer second closest to the base on the sintered layer closest to the base.

The solid freeform fabrication device 1 repeats the supplying process and the layer forming process to laminate sintered layers. At the completion of fabrication based on all of the multiple two-dimensional data, a fabrication object having the same form as the 3D model is obtained.

Solid Freeform Fabrication Object

The solid freeform fabrication object can be suitably manufactured by the method of manufacturing a solid freeform fabrication object of the present disclosure.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Embodiments of the present invention are described in detail below, but the present invention is not limited thereto.

Example 1

Preparation of First Particle Powder 1

Polybutylene terephthalate (PBT) resin (NOVA-DURAN® 5020, melting point of 218 degrees C., glass transition temperature of 43 degrees C., manufactured by Mitsubishi Engineering-Plastics Corporation) was stirred at a temperature 30 degrees C. higher than the melting point thereof to form a resin melt for solid freeform fabrication and thereafter the resin melt was stretched into a fibrous form using an extruder (manufactured by The Japan Steel Works, LTD.) having a nozzle having a circular orifice. The fiber was adjusted to have a fiber diameter of 55 μm by stretching the fiber 4 times.

Thereafter, the formed fibers were disposed side by side in the same direction, and a pressure of 10 MPa was applied while heating at the temperature 50 degrees C. lower than the melting point to unify the fiber into a sheet-like form. The cross-sectional form of each fiber unified into a sheet-like form was substantially polygonal.

Further, the fibers unified into the sheet-like form were cut in such a manner that the cut width was 50 μm and the cut speed was 280 shots per minute (spm) using a cutting device of a push-off type (NJ Series 1200 type, manufactured by Ogino Seiki Co., Ltd.).

Thereafter, in order to melt the surface by mechanical friction, the obtained cut article was treated with a multi-purpose mixer (manufactured by Nippon Coke & Engineering Co., Ltd.) at a rotation speed of 9000 rpm for 20 minutes to obtain first particle powder 1. The volume average particle diameter was 80 μm and the MFR value was 10 g/10 min.

Preparation of Second Particle Powder 1

A polybutylene terephthalate (PBT) resin (NOVA-DURAN® 5010, melting point of 218 degrees C., glass transition temperature of 43 degrees C., manufactured by Mitsubishi Engineering-Plastics Corporation) was subjected to frost shattering at −200 degrees C. using a cyrogenic grinding unit (LINREX MILL LX1, manufactured by Hosokawa Micron Corporation) to obtain a resin powder for solid freeform fabrication. The thus-obtained resin powder for solid freeform fabrication was pulverized until the size ranged from 5 to 100 μm to obtain second particle powder 1. The volume average particle diameter was 40 μm and the MFR value was 20 g/10 min.

Preparation of Powder Material 1 for Solid FreeForm Fabrication 8 kg of the first particle powder 1 and 2 kg of the second particle powder 1 were mixed using a TURBRAMIXER (manufactured by Shinmaru Enterprises Corporation) for 30 minutes to obtain powder 1 for solid freeform fabrication.

Example 2

Preparation of First Particle Powder 2

Polybutylene terephthalate (PBT) resin (NOVA-DURAN® 5020, melting point of 218 degrees C., glass transition temperature of 43 degrees C., manufactured by Mitsubishi Engineering-Plastics Corporation) was stirred at a temperature 30 degrees C. higher than the melting point thereof to form a resin melt for solid freeform fabrication and thereafter the resin melt was stretched into a fibrous form using an extruder (manufactured by The Japan Steel Works, LTD.) having a nozzle having a circular orifice. The fiber was adjusted to have a fiber diameter of 55 μm by stretching the fiber 4 times.

Thereafter, the formed fibers were disposed side by side in the same direction, and a pressure of 10 MPa was applied while heating at the temperature 50 degrees C. lower than the melting point to unify the fiber into a sheet-like form. The cross-sectional form of each fiber unified into a sheet-like form was substantially polygonal.

Further, the fibers unified into the sheet-like form were cut in such a manner that the cut width was 50 μm and the cut speed was 280 shots per minute (spm) using a cutting device of a push-off type (NJ Series 1200 type, manufactured by Ogino Seiki Co., Ltd.).

Thereafter, in order to melt the surface by mechanical friction, the obtained cut article was treated with a multi-purpose mixer (manufactured by Nippon Coke & Engineering Co., Ltd.) at a rotation speed of 9000 rpm for 20 minutes to obtain first particle powder 2. The volume average particle diameter was 80 μm and the MFR value was 10 g/10 min.

Preparation of Second Particle Powder 2

A polybutylene terephthalate (PBT) resin (NOVA-DURAN® 5010, melting point of 218 degrees C., glass transition temperature of 43 degrees C., manufactured by Mitsubishi Engineering-Plastics Corporation) and a polybutylene terephthalate (PBT) resin (NOVADURAN® 5008, melting point of 218 degrees C., glass transition temperature of 43 degrees C., manufactured by Mitsubishi Engineering-Plastics Corporation) were mixed in a ratio of 5:5 using a TURBRAMIXER (manufactured by Shinmaru Enterprises Corporation) for 30 minutes. Thereafter, using a desktop type kneading and extruding micro pellet making device (1AEC, manufactured by IMOTO MACHINERY CO., LTD.), the mixture was subjected to melting, kneading and pelletizing at a temperature 30 degrees C. higher than the melting point to prepare PBT pellets. The thus-obtained pellet was subjected to frost shattering at −200 degrees C. using a cyrogenic grinding unit (LINREX MILL LX1, manufactured by Hosokawa Micron Corporation) to obtain a resin powder for solid freeform fabrication. The thus-obtained resin powder for solid freeform fabrication was pulverized until the size ranged from 5 to 100 μm to obtain second particle powder 2. The volume average particle diameter was 40 μm and the MFR value was 30 g/10 min.

Preparation of Powder Material 2 for Solid Freeform Fabrication 8 kg of the first particle powder 2 and 2 kg of the second particle powder 2 were mixed using a TURBRAMIXER (manufactured by Shinmaru Enterprises Corporation) for 30 minutes to obtain powder 2 for solid freeform fabrication.

Example 3

Preparation of First Particle Powder 3

Polybutylene terephthalate (PBT) resin (NOVA-DURAN® 5020, melting point of 218 degrees C., glass transition temperature of 43 degrees C., manufactured by Mitsubishi Engineering-Plastics Corporation) was stirred at a temperature 30 degrees C. higher than the melting point thereof to form a resin melt for solid freeform fabrication and thereafter the resin melt was stretched into a fibrous form using an extruder (manufactured by The Japan Steel Works, LTD.) having a nozzle having a circular orifice. The fiber was adjusted to have a fiber diameter of 55 μm by stretching the fiber 4 times.

Thereafter, the formed fibers were disposed side by side in the same direction, and a pressure of 10 MPa was applied while heating at the temperature 50 degrees C. lower than the melting point to unify the fiber into a sheet-like form. The cross-sectional form of each fiber unified into a sheet-like form was substantially polygonal.

Further, the fibers unified into the sheet-like form were cut in such a manner that the cut width was 50 μm and the cut speed was 280 shots per minute (spm) using a cutting device of a push-off type (NJ Series 1200 type, manufactured by Ogino Seiki Co., Ltd.).

Thereafter, in order to melt the surface by mechanical friction, the obtained cut article was treated with a multi-purpose mixer (manufactured by Nippon Coke & Engineering Co., Ltd.) at a rotation speed of 9000 rpm for 20 minutes to obtain first particle powder 3. The volume average particle diameter was 80 μm and the MFR value was 10 g/10 min.

Preparation of Second Particle Powder 3

A polybutylene terephthalate (PBT) resin (NOVA-DURAN® 5008, melting point of 218 degrees C., glass transition temperature of 43 degrees C., manufactured by Mitsubishi Engineering-Plastics Corporation) was subjected to frost shattering at −200 degrees C. using a cyrogenic grinding unit (LINREX MILL LX1, manufactured by Hosokawa Micron Corporation) to obtain a resin powder for solid freeform fabrication. The thus-obtained resin powder for solid freeform fabrication was pulverized until the size ranged from 5 to 100 μm to obtain second particle powder 3. The volume average particle diameter was 40 μm and the MFR value was 38 g/10 min.

Preparation of Powder Material 3 for Solid Freeform Fabrication 8 kg of the first particle powder 3 and 2 kg of the second particle powder 3 were mixed using a TURBRAMIXER (manufactured by Shinmaru Enterprises Corporation) for 30 minutes to obtain powder 3 for solid freeform fabrication.

Example 4

Preparation of First Particle Powder 4

Polybutylene terephthalate (PBT) resin (NOVA-DURAN® 5026, melting point of 218 degrees C., glass transition temperature of 43 degrees C., manufactured by Mitsubishi Engineering-Plastics Corporation) was stirred at a temperature 30 degrees C. higher than the melting point thereof to form a resin melt for solid freeform fabrication and thereafter the resin melt was stretched into a fibrous form using an extruder (manufactured by The Japan Steel Works, LTD.) having a nozzle having a circular orifice. The fiber was adjusted to have a fiber diameter of 55 μm by stretching the fiber 4 times.

Thereafter, the formed fibers were disposed side by side in the same direction, and a pressure of 10 MPa was applied while heating at the temperature 50 degrees C. lower than the melting point to unify the fiber into a sheet-like form. The cross-sectional form of each fiber unified into a sheet-like form was substantially polygonal.

Further, the fibers unified into the sheet-like form were cut in such a manner that the cut width was 50 μm and the cut speed was 280 shots per minute (spm) using a cutting device of a push-off type (NJ Series 1200 type, manufactured by Ogino Seiki Co., Ltd.).

Thereafter, in order to melt the surface by mechanical friction, the obtained cut article was treated with a multi-purpose mixer (manufactured by Nippon Coke & Engineering Co., Ltd.) at a rotation speed of 9000 rpm for 20 minutes to obtain first particle powder 4. The volume average particle diameter was 80 μm and the MFR value was 7 g/10 min.

Preparation of Second Particle Powder 4

A polybutylene terephthalate (PBT) resin (NOVA-DURAN® 5010, melting point of 218 degrees C., glass transition temperature of 43 degrees C., manufactured by Mitsubishi Engineering-Plastics Corporation) and a polybutylene terephthalate (PBT) resin (NOVADURAN® 5008, melting point of 218 degrees C., glass transition temperature of 43 degrees C., manufactured by Mitsubishi Engineering-Plastics Corporation) were mixed in a ratio of 5:5 using a TURBRAMIXER (manufactured by Shinmaru Enterprises Corporation) for 30 minutes. Thereafter, using a desktop type kneading and extruding micro pellet making device (1 AEC, manufactured by IMOTO MACHINERY CO., LTD.), the mixture was subjected to melting, kneading and pelletizing at a temperature 30 degrees C. higher than the melting point to prepare PBT pellets. The thus-obtained pellet was subjected to frost shattering at −200 degrees C. using a cyrogenic grinding unit (LINREX MILL LX1, manufactured by Hosokawa Micron Corporation) to obtain a resin powder for solid freeform fabrication. The thus-obtained resin powder for solid freeform fabrication was pulverized until the size ranged from 5 to 100 μm to obtain second particle powder 4. The volume average particle diameter was 40 μm and the MFR value was 30 g/10 min.

Preparation of Powder Material 4 for Solid Freeform Fabrication 8 kg of the first particle powder 4 and 2 kg of the second particle powder 4 were mixed using a TURBRAMIXER (manufactured by Shinmaru Enterprises Corporation) for 30 minutes to obtain powder 4 for solid freeform fabrication.

Example 5

Preparation of First Particle Powder 5

A polybutylene terephthalate (PBT) resin (NOVA-DURAN® 5020, melting point of 218 degrees C., glass transition temperature of 43 degrees C., manufactured by Mitsubishi Engineering-Plastics Corporation) and a polybutylene terephthalate (PBT) resin (NOVADURAN® 5026, melting point of 218 degrees C., glass transition temperature of 43 degrees C., manufactured by Mitsubishi Engineering-Plastics Corporation) were mixed in a ratio of 5:5 using a TURBRAMIXER (manufactured by Shinmaru Enterprises Corporation) for 30 minutes. Thereafter, the mixture was stirred at a temperature 30 degrees C. higher than the melting point to obtain a resin melt for solid freeform fabrication, which was thereafter stretched into a fibrous form using an extruder (manufactured by The Japan Steel Works, LTD.) having a circular nozzle orifice. The fiber was adjusted to have a fiber diameter of 55 µm by stretching the fiber 4 times.

Thereafter, the formed fibers were disposed side by side in the same direction, and a pressure of 10 MPa was applied while heating at the temperature 50 degrees C. lower than the melting point to unify the fiber into a sheet-like form. The cross-sectional form of each fiber unified into a sheet-like form was substantially polygonal.

Further, the fibers unified into the sheet-like form were cut in such a manner that the cut width was 50 µm and the cut speed was 280 shots per minute (spm) using a cutting device of a push-off type (NJ Series 1200 type, manufactured by Ogino Seiki Co., Ltd.).

Thereafter, in order to melt the surface by mechanical friction, the obtained cut article was treated with a multi-purpose mixer (manufactured by Nippon Coke & Engineering Co., Ltd.) at a rotation speed of 9000 rpm for 20 minutes to obtain first particle powder 5. The volume average particle diameter was 80 µm and the MFR value was 8.5 g/10 min.

Preparation of Second Particle Powder 5

A polybutylene terephthalate (PBT) resin (NOVA-DURAN® 5008, melting point of 218 degrees C., glass transition temperature of 43 degrees C., manufactured by Mitsubishi Engineering-Plastics Corporation) was subjected to frost shattering at −200 degrees C. using a cyrogenic grinding unit (LINREX MILL LX1, manufactured by Hosokawa Micron Corporation) to obtain a resin powder for solid freeform fabrication. The thus-obtained resin powder for solid freeform fabrication was pulverized until the size ranged from 5 to 100 µm to obtain second particle powder 5. The volume average particle diameter was 40 µm and the MFR value was 38 g/10 min.

Preparation of Powder Material 5 for Solid Freeform Fabrication 8 kg of the first particle powder 5 and 2 kg of the second particle powder 5 were mixed using a TURBRAMIXER (manufactured by Shinmaru Enterprises Corporation) for 30 minutes to obtain powder 5 for solid freeform fabrication.

Example 6

Preparation of First Particle Powder 6

Polybutylene terephthalate (PBT) resin (NOVA-DURAN® 5020, melting point of 218 degrees C., glass transition temperature of 43 degrees C., manufactured by Mitsubishi Engineering-Plastics Corporation) was stirred at a temperature 30 degrees C. higher than the melting point thereof to form a resin melt for solid freeform fabrication and thereafter the resin melt was stretched into a fibrous form using an extruder (manufactured by The Japan Steel Works, LTD.) having a nozzle having a circular orifice. The fiber was adjusted to have a fiber diameter of 55 µm by stretching the fiber 4 times.

Thereafter, the formed fibers were disposed side by side in the same direction, and a pressure of 10 MPa was applied while heating at the temperature 50 degrees C. lower than the melting point to unify the fiber into a sheet-like form. The cross-sectional form of each fiber unified into a sheet-like form was substantially polygonal.

Further, the fibers unified into the sheet-like form were cut in such a manner that the cut width was 50 µm and the cut speed was 280 shots per minute (spm) using a cutting device of a push-off type (NJ Series 1200 type, manufactured by Ogino Seiki Co., Ltd.).

Thereafter, in order to melt the surface by mechanical friction, the obtained cut article was treated with a multi-purpose mixer (manufactured by Nippon Coke & Engineering Co., Ltd.) at a rotation speed of 9000 rpm for 20 minutes to obtain first particle powder 6. The volume average particle diameter was 80 µm and the MFR value was 10 g/10 min.

Preparation of Second Particle Powder 6

A polybutylene terephthalate (PBT) resin (NOVA-DURAN® 5008, melting point of 218 degrees C., glass transition temperature of 43 degrees C., manufactured by Mitsubishi Engineering-Plastics Corporation) was subjected to frost shattering at −200 degrees C. using a cyrogenic grinding unit (LINREX MILL LX1, manufactured by Hosokawa Micron Corporation) to obtain a resin powder for solid freeform fabrication. The thus-obtained resin powder for solid freeform fabrication was pulverized until the size ranged from 5 to 100 µm to obtain second particle powder 6. The volume average particle diameter was 40 µm and the MFR value was 38 g/10 min.

Preparation of Powder Material 6 for Solid Freeform Fabrication 5 kg of the first particle powder 6 and 5 kg of the second particle powder 6 were mixed using a TURBRAMIXER (manufactured by Shinmaru Enterprises Corporation) for 30 minutes to obtain powder 6 for solid freeform fabrication.

Example 7

Preparation of First Particle Powder 7

Polybutylene terephthalate (PBT) resin (NOVA-DURAN® 5020, melting point of 218 degrees C., glass transition temperature of 43 degrees C., manufactured by Mitsubishi Engineering-Plastics Corporation) was stirred at a temperature 30 degrees C. higher than the melting point thereof to form a resin melt for solid freeform fabrication and thereafter the resin melt was stretched into a fibrous form using an extruder (manufactured by The Japan Steel Works, LTD.) having a nozzle having a circular orifice. The fiber was adjusted to have a fiber diameter of 55 µm by stretching the fiber 4 times.

Thereafter, the formed fibers were disposed side by side in the same direction, and a pressure of 10 MPa was applied while heating at the temperature 50 degrees C. lower than the melting point to unify the fiber into a sheet-like form. The cross-sectional form of each fiber unified into a sheet-like form was substantially polygonal.

Further, the fibers unified into the sheet-like form were cut in such a manner that the cut width was 50 µm and the cut speed was 280 shots per minute (spm) using a cutting device of a push-off type (NJ Series 1200 type, manufactured by Ogino Seiki Co., Ltd.).

Thereafter, in order to melt the surface by mechanical friction, the obtained cut article was treated with a multi-purpose mixer (manufactured by Nippon Coke & Engineering Co., Ltd.) at a rotation speed of 9000 rpm for 20 minutes to obtain first particle powder 7. The volume average particle diameter was 80 µm and the MFR value was 10 g/10 min.

Preparation of Second Particle Powder 7

A polybutylene terephthalate (PBT) resin (NOVA-DURAN® 5008, melting point of 218 degrees C., glass transition temperature of 43 degrees C., manufactured by Mitsubishi Engineering-Plastics Corporation) was subjected to frost shattering at −200 degrees C. using a cyrogenic grinding unit (LINREX MILL LX1, manufactured by Hosokawa Micron Corporation) to obtain a resin powder for solid freeform fabrication. The thus-obtained resin powder for solid freeform fabrication was pulverized until the size ranged from 5 to 100 μm to obtain second particle powder 7. The volume average particle diameter was 40 μm and the MFR value was 38 g/10 min.

Preparation of Powder Material 7 for Solid Freeform Fabrication 9.5 kg of the first particle powder 7 and 0.5 kg of the second particle powder 7 were mixed using a TURBRA-MIXER (manufactured by Shinmaru Enterprises Corporation) for 30 minutes to obtain powder 7 for solid freeform fabrication.

Example 8

Preparation of First Particle Powder 8

Polybutylene terephthalate (PBT) resin (NOVA-DURAN® 5020, melting point of 218 degrees C., glass transition temperature of 43 degrees C., manufactured by Mitsubishi Engineering-Plastics Corporation) was stirred at a temperature 30 degrees C. higher than the melting point thereof to form a resin melt for solid freeform fabrication and thereafter the resin melt was stretched into a fibrous form using an extruder (manufactured by The Japan Steel Works, LTD.) having a nozzle having a circular orifice. The fiber was adjusted to have a fiber diameter of 55 μm by stretching the fiber 4 times.

Thereafter, the formed fibers were disposed side by side in the same direction, and a pressure of 10 MPa was applied while heating at the temperature 50 degrees C. lower than the melting point to unify the fiber into a sheet-like form. The cross-sectional form of each fiber unified into a sheet-like form was substantially polygonal.

Further, the fibers unified into the sheet-like form were cut in such a manner that the cut width was 50 μm and the cut speed was 280 shots per minute (spm) using a cutting device of a push-off type (NJ Series 1200 type, manufactured by Ogino Seiki Co., Ltd.).

Thereafter, in order to melt the surface by mechanical friction, the obtained cut article was treated with a multi-purpose mixer (manufactured by Nippon Coke & Engineering Co., Ltd.) at a rotation speed of 9000 rpm for 20 minutes to obtain first particle powder 8. The volume average particle diameter was 80 μm and the MFR value was 10 g/10 min.

Preparation of Second Particle Powder 8

A polybutylene terephthalate (PBT) resin (NOVA-DURAN® 5008, melting point of 218 degrees C., glass transition temperature of 43 degrees C., manufactured by Mitsubishi Engineering-Plastics Corporation) was subjected to frost shattering at −200 degrees C. using a cyrogenic grinding unit (LINREX MILL LX1, manufactured by Hosokawa Micron Corporation) to obtain a resin powder for solid freeform fabrication. The thus-obtained resin powder for solid freeform fabrication was pulverized until the size ranged from 5 to 100 μm to obtain second particle powder 8. The volume average particle diameter was 40 μm and the MFR value was 38 g/10 min.

Preparation of Powder Material 8 for Solid Freeform Fabrication 4 kg of the first particle powder 8 and 6 kg of the second particle powder 8 were mixed using a TURBRAMIXER (manufactured by Shinmaru Enterprises Corporation) for 30 minutes to obtain powder 8 for solid freeform fabrication.

Example 9

Preparation of First Particle Powder 9

Polybutylene terephthalate (PBT) resin (NOVA-DURAN® 5020, melting point of 218 degrees C., glass transition temperature of 43 degrees C., manufactured by Mitsubishi Engineering-Plastics Corporation) was stirred at a temperature 30 degrees C. higher than the melting point thereof to form a resin melt for solid freeform fabrication and thereafter the resin melt was stretched into a fibrous form using an extruder (manufactured by The Japan Steel Works, LTD.) having a nozzle having a circular orifice. The fiber was adjusted to have a fiber diameter of 55 μm by stretching the fiber 4 times.

Thereafter, the formed fibers were disposed side by side in the same direction, and a pressure of 10 MPa was applied while heating at the temperature 50 degrees C. lower than the melting point to unify the fiber into a sheet-like form. The cross-sectional form of each fiber unified into a sheet-like form was substantially polygonal.

Further, the fibers unified into the sheet-like form were cut in such a manner that the cut width was 50 μm and the cut speed was 280 shots per minute (spm) using a cutting device of a push-off type (NJ Series 1200 type, manufactured by Ogino Seiki Co., Ltd.).

Thereafter, in order to melt the surface by mechanical friction, the obtained cut article was treated with a multi-purpose mixer (manufactured by Nippon Coke & Engineering Co., Ltd.) at a rotation speed of 9000 rpm for 20 minutes to obtain first particle powder 9. The volume average particle diameter was 80 μm and the MFR value was 10 g/10 min.

Preparation of Second Particle Powder 9

A polybutylene terephthalate (PBT) resin (NOVA-DURAN® 5008, melting point of 218 degrees C., glass transition temperature of 43 degrees C., manufactured by Mitsubishi Engineering-Plastics Corporation) was subjected to frost shattering at −200 degrees C. using a cyrogenic grinding unit (LINREX MILL LX1, manufactured by Hosokawa Micron Corporation) to obtain a resin powder for solid freeform fabrication. The thus-obtained resin powder for solid freeform fabrication was pulverized until the size ranged from 5 to 100 μm to obtain second particle powder 9. The volume average particle diameter was 40 μm and the MFR value was 38 g/10 min.

Preparation of Powder Material 9 for Solid Freeform Fabrication 9.8 kg of the first particle powder 9 and 0.2 kg of the second particle powder 9 were mixed using a TURBRA-MIXER (manufactured by Shinmaru Enterprises Corporation) for 30 minutes to obtain powder 9 for solid freeform fabrication.

Example 10

Preparation of First Particle Powder 10

Polybutylene terephthalate (PBT) resin (NOVA-DURAN® 5020, melting point of 218 degrees C., glass transition temperature of 43 degrees C., manufactured by Mitsubishi Engineering-Plastics Corporation) was stirred at a temperature 30 degrees C. higher than the melting point thereof to form a resin melt for solid freeform fabrication and thereafter the resin melt was stretched into a fibrous form using an extruder (manufactured by The Japan Steel Works, LTD.) having a nozzle having a circular orifice. The fiber was adjusted to have a fiber diameter of 55 μm by stretching the fiber 4 times.

Thereafter, the formed fibers were disposed side by side in the same direction, and a pressure of 10 MPa was applied while heating at the temperature 50 degrees C. lower than the melting point to unify the fiber into a sheet-like form. The cross-sectional form of each fiber unified into a sheet-like form was substantially polygonal.

Further, the fibers unified into the sheet-like form were cut in such a manner that the cut width was 50 μm and the cut speed was 280 shots per minute (spm) using a cutting device of a push-off type (NJ Series 1200 type, manufactured by Ogino Seiki Co., Ltd.).

Thereafter, in order to melt the surface by mechanical friction, the obtained cut article was treated with a multi-purpose mixer (manufactured by Nippon Coke & Engineering Co., Ltd.) at a rotation speed of 9000 rpm for 20 minutes to obtain first particle powder 10. The volume average particle diameter was 80 μm and the MFR value was 10 g/10 min.

Preparation of Second Particle Powder 10

A polybutylene terephthalate (PBT) resin (NOVA-DURAN® 5008, melting point of 218 degrees C., glass transition temperature of 43 degrees C., manufactured by Mitsubishi Engineering-Plastics Corporation) was subjected to frost shattering at −200 degrees C. using a cyrogenic grinding unit (LINREX MILL LX1, manufactured by Hosokawa Micron Corporation) to obtain a resin powder for solid freeform fabrication. The thus-obtained resin powder for solid freeform fabrication was pulverized until the size ranged from 5 to 200 μm to obtain second particle powder 10. The volume average particle diameter was 80 μm and the MFR value was 38 g/10 min.

Preparation of Powder Material 10 for Solid Freeform Fabrication 8.0 kg of the first particle powder 10 and 2.0 kg of the second particle powder 10 were mixed using a TURBRA-MIXER (manufactured by Shinmaru Enterprises Corporation) for 30 minutes to obtain powder 10 for solid freeform fabrication.

Example 11

Preparation of First Particle Powder 11

Polybutylene terephthalate (PBT) resin (NOVA-DURAN® 5020, melting point of 218 degrees C., glass transition temperature of 43 degrees C., manufactured by Mitsubishi Engineering-Plastics Corporation) was stirred at a temperature 30 degrees C. higher than the melting point thereof to form a resin melt for solid freeform fabrication and thereafter the resin melt was stretched into a fibrous form using an extruder (manufactured by The Japan Steel Works, LTD.) having a nozzle having a circular orifice. The fiber was adjusted to have a fiber diameter of 55 μm by stretching the fiber 4 times.

Thereafter, the formed fibers were disposed side by side in the same direction, and a pressure of 10 MPa was applied while heating at the temperature 50 degrees C. lower than the melting point to unify the fiber into a sheet-like form. The cross-sectional form of each fiber unified into a sheet-like form was substantially polygonal.

Further, the fibers unified into the sheet-like form were cut in such a manner that the cut width was 50 μm and the cut speed was 280 shots per minute (spm) using a cutting device of a push-off type (NJ Series 1200 type, manufactured by Ogino Seiki Co., Ltd.).

Thereafter, in order to melt the surface by mechanical friction, the obtained cut article was treated with a multi-purpose mixer (manufactured by Nippon Coke & Engineering Co., Ltd.) at a rotation speed of 9000 rpm for 50 minutes to obtain first particle powder 11. The volume average particle diameter was 40 μm and the MFR value was 10 g/10 min.

Preparation of Second Particle Powder 11

A polybutylene terephthalate (PBT) resin (NOVA-DURAN® 5008, melting point of 218 degrees C., glass transition temperature of 43 degrees C., manufactured by Mitsubishi Engineering-Plastics Corporation) was subjected to frost shattering at −200 degrees C. using a cyrogenic grinding unit (LINREX MILL LX1, manufactured by Hosokawa Micron Corporation) to obtain a resin powder for solid freeform fabrication. The thus-obtained resin powder for solid freeform fabrication was pulverized until the size ranged from 5 to 200 μm to obtain second particle powder 11. The volume average particle diameter was 80 μm and the MFR value was 38 g/10 min.

Preparation of Powder Material 11 for Solid Freeform Fabrication 8.0 kg of the first particle powder 11 and 2.0 kg of the second particle powder 11 were mixed using a TURBRA-MIXER (manufactured by Shinmaru Enterprises Corporation) for 30 minutes to obtain powder 11 for solid freeform fabrication.

Example 12

Preparation of First Particle Powder 12

A polybutylene terephthalate (PBT) resin (NOVA-DURAN® 5020, melting point of 218 degrees C., glass transition temperature of 43 degrees C., manufactured by Mitsubishi Engineering-Plastics Corporation) was subjected to frost shattering at −200 degrees C. using a cyrogenic grinding unit (LINREX MILL LX1, manufactured by Hosokawa Micron Corporation) to obtain a resin powder for solid freeform fabrication. The thus-obtained resin powder for solid freeform fabrication was pulverized until the size ranged from 5 to 200 μm to obtain first particle powder 12. The volume average particle diameter was 80 μm and the MFR value was 10 g/10 min.

Preparation of Second Particle Powder 12

A polybutylene terephthalate (PBT) resin (NOVA-DURAN® 5008, melting point of 218 degrees C., glass transition temperature of 43 degrees C., manufactured by Mitsubishi Engineering-Plastics Corporation) was subjected to frost shattering at −200 degrees C. using a cyrogenic grinding unit (LINREX MILL LX1, manufactured by Hosokawa Micron Corporation) to obtain a resin powder for solid freeform fabrication. The thus-obtained resin powder for solid freeform fabrication was pulverized until the size ranged from 5 to 100 μm to obtain second particle powder 12. The volume average particle diameter was 40 μm and the MFR value was 38 g/10 min.

Preparation of Powder Material 12 for Solid Freeform Fabrication 8.0 kg of the first particle powder 12 and 2.0 kg of the second particle powder 12 were mixed using a TURBRA-MIXER (manufactured by Shinmaru Enterprises Corporation) for 30 minutes to obtain powder 12 for solid freeform fabrication.

Example 13

Preparation of First Particle Powder 13

Polybutylene terephthalate (PBT) resin (NOVA-DURAN® 5020, melting point of 218 degrees C., glass transition temperature of 43 degrees C., manufactured by Mitsubishi Engineering-Plastics Corporation) was stirred at a temperature 30 degrees C. higher than the melting point thereof to form a resin melt for solid freeform fabrication and thereafter the resin melt was stretched into a fibrous form using an extruder (manufactured by The Japan Steel Works, LTD.) having a nozzle having a circular orifice. The fiber was adjusted to have a fiber diameter of 55 μm by stretching the fiber 4 times.

Thereafter, the formed fibers were disposed side by side in the same direction, and a pressure of 10 MPa was applied while heating at the temperature 50 degrees C. lower than the melting point to unify the fiber into a sheet-like form. The cross-sectional form of each fiber unified into a sheet-like form was substantially polygonal.

Further, the fibers unified into the sheet-like form were cut in such a manner that the cut width was 50 μm and the cut speed was 280 shots per minute (spm) using a cutting device of a push-off type (NJ Series 1200 type, manufactured by Ogino Seiki Co., Ltd.).

Thereafter, in order to melt the surface by mechanical friction, the obtained cut article was treated with a multipurpose mixer (manufactured by Nippon Coke & Engineering Co., Ltd.) at a rotation speed of 9000 rpm for 20 minutes to obtain first particle powder 13. The volume average particle diameter was 80 μm and the MFR value was 10 g/10 min.

Preparation of Second Particle Powder 13

Polybutylene terephthalate (PBT) resin (NOVA-DURAN® 5008, melting point of 218 degrees C., glass transition temperature of 43 degrees C., manufactured by Mitsubishi Engineering-Plastics Corporation) was stirred at a temperature 30 degrees C. higher than the melting point thereof to form a resin melt for solid freeform fabrication and thereafter the resin melt was stretched into a fibrous form using an extruder (manufactured by The Japan Steel Works, LTD.) having a nozzle having a circular orifice. The fiber was adjusted to have a fiber diameter of 55 μm by stretching the fiber 4 times.

Thereafter, the formed fibers were disposed side by side in the same direction, and a pressure of 10 MPa was applied while heating at the temperature 50 degrees C. lower than the melting point to unify the fiber into a sheet-like form. The cross-sectional form of each fiber unified into a sheet-like form was substantially polygonal.

Further, the fibers unified into the sheet-like form were cut in such a manner that the cut width was 30 μm and the cut speed was 280 shots per minute (spm) using a cutting device of a push-off type (NJ Series 1200 type, manufactured by Ogino Seiki Co., Ltd.).

Thereafter, in order to melt the surface by mechanical friction, the obtained cut article was treated with a multipurpose mixer (manufactured by Nippon Coke & Engineering Co., Ltd.) at a rotation speed of 9000 rpm for 20 minutes to obtain first particle powder 13. The volume average particle diameter was 40 μm and the MFR value was 38 g/10 min.

Preparation of Powder Material 13 for Solid Freeform Fabrication 9.5 kg of the first particle powder 13 and 0.5 kg of the second particle powder 13 were mixed using a TURBRA-MIXER (manufactured by Shinmaru Enterprises Corporation) for 30 minutes to obtain powder 13 for solid freeform fabrication.

Comparative Example 1

Preparation of First Particle Powder 14

A polybutylene terephthalate (PBT) resin (NOVA-DURAN® 5026, melting point of 218 degrees C., glass transition temperature of 43 degrees C., manufactured by Mitsubishi Engineering-Plastics Corporation) was subjected to frost shattering at −200 degrees C. using a cyrogenic grinding unit (LINREX MILL LX1, manufactured by Hosokawa Micron Corporation) to obtain a resin powder for solid freeform fabrication. The thus-obtained resin powder for solid freeform fabrication was pulverized until the size ranged from 5 to 200 μm to obtain first particle powder 14. The volume average particle diameter was 80 μm and the MFR value was 7 g/10 min.

Preparation of Second Particle Powder 14

A polybutylene terephthalate (PBT) resin (NOVA-DURAN® 5020, melting point of 218 degrees C., glass transition temperature of 43 degrees C., manufactured by Mitsubishi Engineering-Plastics Corporation) was subjected to frost shattering at −200 degrees C. using a cyrogenic grinding unit (LINREX MILL LX1, manufactured by Hosokawa Micron Corporation) to obtain a resin powder for solid freeform fabrication. The thus-obtained resin powder for solid freeform fabrication was pulverized until the size ranged from 5 to 100 μm to obtain second particle powder 14. The volume average particle diameter was 40 μm and the MFR value was 10 g/10 min.

Preparation of Powder Material 14 for Solid Freeform Fabrication 8.0 kg of the first particle powder 14 and 2.0 kg of the second particle powder 14 were mixed using a TURBRA-MIXER (manufactured by Shinmaru Enterprises Corporation) for 30 minutes to obtain powder 14 for solid freeform fabrication.

Comparative Example 2

Preparation of First Particle Powder 15

A polybutylene terephthalate (PBT) resin (NOVA-DURAN® 5026, melting point of 218 degrees C., glass transition temperature of 43 degrees C., manufactured by Mitsubishi Engineering-Plastics Corporation) was subjected to frost shattering at −200 degrees C. using a cyrogenic grinding unit (LINREX MILL LX1, manufactured by Hosokawa Micron Corporation) to obtain a resin powder for solid freeform fabrication. The thus-obtained resin powder for solid freeform fabrication was pulverized until the size ranged from 5 to 200 μm to obtain first particle powder 15. The volume average particle diameter was 80 μm and the MFR value was 7 g/10 min.

Preparation of Second Particle Powder 15

A polybutylene terephthalate (PBT) resin (NOVA-DURAN® 5008, melting point of 218 degrees C., glass transition temperature of 43 degrees C., manufactured by Mitsubishi Engineering-Plastics Corporation) was subjected to frost shattering at −200 degrees C. using a cyrogenic grinding unit (LINREX MILL LX1, manufactured by Hosokawa Micron Corporation) to obtain a resin powder for solid freeform fabrication. The thus-obtained resin powder for solid freeform fabrication was pulverized until the size ranged from 5 to 100 μm to obtain second particle powder 15. The volume average particle diameter was 40 μm and the MFR value was 38 g/10 min.

Preparation of Powder Material 15 for Solid Freeform Fabrication 8.0 kg of the first particle powder 15 and 2.0 kg of the second particle powder 15 were mixed using a TURBRA-MIXER (manufactured by Shinmaru Enterprises Corporation) for 30 minutes to obtain powder 15 for solid freeform fabrication.

Comparative Example 3

Preparation of Powder Material 16 for Solid Freeform Fabrication

A polybutylene terephthalate (PBT) resin (NOVA-DURAN® 5026, melting point of 218 degrees C., glass transition temperature of 43 degrees C., manufactured by Mitsubishi Engineering-Plastics Corporation) was subjected to frost shattering at −200 degrees C. using a cyrogenic grinding unit (LINREX MILL LX1, manufactured by Hosokawa Micron Corporation) to obtain a resin powder for solid freeform fabrication. The thus-obtained resin powder for solid freeform fabrication was pulverized until the size ranged from 5 to 200 μm to obtain powder 16 for solid freeform fabrication. The volume average particle diameter was 80 μm and the MFR value was 7 g/10 min.

Comparative Example 4

Preparation of Powder Material 17 for Solid Freeform Fabrication

A polybutylene terephthalate (PBT) resin (NOVA-DURAN® 5008, melting point of 218 degrees C., glass transition temperature of 43 degrees C., manufactured by Mitsubishi Engineering-Plastics Corporation) was subjected to frost shattering at −200 degrees C. using a cyrogenic grinding unit (LINREX MILL LX1, manufactured by Hosokawa Micron Corporation) to obtain a resin powder for solid freeform fabrication. The thus-obtained resin powder for solid freeform fabrication was pulverized until the size ranged from 5 to 200 μm to obtain powder 17 for solid freeform fabrication. The volume average particle diameter was 80 μm and the MFR value was 38 g/10 min.

Measuring and Evaluation

Properties of the powders for solid freeform fabrication obtained in each Example and Comparative Example were measured and evaluated regarding fabrication quality. The results are shown in Table 1.

Resin Particle Properties

Ratio of Melt Mass-Flow Rate (MFR)

MFR was measured under a load of 2.16 kg using a melt mass-flow rate measuring device (Type D405913, manufactured by Dynisco, LLC.) according to JIS 7210 format (ISO 1133 regulation). The temperature was set to be 15 degrees C. higher than the melting point. After the resin powder was filled in the measuring device, the resin was heated for two minutes or longer to sufficiently melt the resin followed by measuring. The MFR ratio was calculated according to the following relation.

MRF ratio=MFR2/MFR1, where MFR1 represents the MFR value of the first resin particle and MFR2 represents the MFR value of the second resin particle.

Volume Average Particle Diameter Dv

The volume average particle diameter Dv (μm) of the powder for solid freeform fabrication was measured using a particle size distribution measuring device (microtrack MT 3300EXII, manufactured by Microtrac Bell Co., Ltd.). The particle refractive index for each resin powder was used and the solvent was not used, and a dry (atmospheric) method was employed without using a solvent.

Form of Powder

The thus-obtained resin powder for solid freeform fabrication was photographed at a magnifying power of 150× using a scanning electron microscope (SEM) (JSM-7800 FPRIME, manufactured by JEOL Ltd.). For the resin powder for solid freeform fabrication in the SEM image, the form having a first surface, a second surface, and a side surface with the entire of the peripheral areas of the first surface and the second surface observed in the range observed by the SEM stretching along the side surface was determined as a columnar form.

Fabrication Quality

Preparation of Test Specimen (Solid Freeform Fabrication)

The thus-obtained resin particle for solid freeform fabrication was added to the supply bed of an SLS type fabrication device (AM S5500P, manufactured by Ricoh Company, Ltd.) to manufacture a solid freeform fabrication object. The setting conditions were: average layer thickness of 0.1 mm, a laser power of from 10 to 150 W, a laser scanning space of 0.1 mm, and a part bed temperature of −3 degrees C. below the melting point. By the SLS type fabrication device, five test specimens (XY fabrication object) were fabricated at the center of the laser scanning space 13 with the long sides oriented in the XY plane direction (the plane direction along which the roller 12 moves in FIG. 4). The gap between each fabrication object was 5 mm. The test specimen was fabricated according to the regulation of International Organization for Standardization (ISO) 3167 Type 1A multi-purpose canine bone-like test specimen (specimen has a center portion of a length of 80 mm, a thickness of 4 mm, and a width of 10 mm). The fabrication time was set to 50 hours.

Accuracy

The length along the width direction of each of the thus-obtained five test specimen was measured at five points by a digital caliper. Subsequent to the calculation of the average of the width length, the deviation from the target width length was calculated as the accuracy using the following relation.

Accuracy (mm)=width average value (mm)−10 (mm)

The evaluation criteria are as follows:
Extremely good: 0.1 mm or less
Good: greater than 0.1 mm and 0.2 mm or less
Inferior: greater than 0.2 mm Strength The tensile strength (MPa) of the thus-obtained five test specimens was measured using a tensile tester (AGS-5 kN, manufactured by Shimadzu Corporation) according to ISO 527 regulation, and the average value was defined as strength. The tensile test speed was 50 mm/min.

The evaluation criteria are as follows:
Extremely good: 80 MPa or more
Good: 55 MPa to less than 80 MPa
Inferior: Less than 55 MPa

TABLE 1

| | Resin formulation First resin particle | | | | |
|---|---|---|---|---|---|
| | Kind of resin | MFR1 (g/10 min.) | Volume average particle diameter Dv (μm) | Form | Composition ratio |
| Example 1 | PBT | 10 | 80 | Columnar form | 80.0 percent |
| Example 2 | PBT | 10 | 80 | Columnar form | 80.0 percent |
| Example 3 | PBT | 10 | 80 | Columnar form | 80.0 percent |
| Example 4 | PBT | 7 | 80 | Columnar form | 80.0 percent |
| Example 5 | PBT | 8.5 | 80 | Columnar form | 80.0 percent |
| Example 6 | PBT | 10 | 80 | Columnar form | 50.0 percent |
| Example 7 | PBT | 10 | 80 | Columnar form | 95.0 percent |
| Example 8 | PBT | 10 | 80 | Columnar form | 40.0 percent |
| Example 9 | PBT | 10 | 80 | Columnar form | 98.0 percent |
| Example 10 | PBT | 10 | 80 | Columnar form | 80.0 percent |
| Example 11 | PBT | 10 | 40 | Columnar form | 80.0 percent |
| Example 12 | PBT | 10 | 80 | Non-columnar form | 80.0 percent |
| Example 13 | PBT | 10 | 80 | Columnar form | 95.0 percent |
| Comparative Example 1 | PBT | 7 | 80 | Non-columnar form | 80.0 percent |
| Comparative Example 2 | PBT | 7 | 80 | Non-columnar form | 80.0 percent |
| Comparative Example 3 | PBT | 7 | 80 | Non-columnar form | 100.0% |
| Comparative Example 4 | PBT | 38 | 80 | Non-columnar form | 100.0% |

| | Resin formulation Second resin particle | | | | | Evaluation Fabrication quality | |
|---|---|---|---|---|---|---|---|
| | Kind of resin | MFR2 (g/10 min.) | Volume average particle diameter Dv (μm) | Form | Composition ratio | MFR ratio | Accuracy (mm) | Strength (MPa) |
| Example 1 | PBT | 20 | 40 | Non-columnar form | 20.0 percent | 2.0 | 0.10 | 65 |
| Example 2 | PBT | 30 | 40 | Non-columnar form | 20.0 percent | 3.0 | 0.10 | 75 |
| Example 3 | PBT | 38 | 40 | Non-columnar form | 20.0 percent | 3.8 | 0.10 | 85 |
| Example 4 | PBT | 30 | 40 | Non-columnar form | 20.0 percent | 4.3 | 0.12 | 80 |
| Example 5 | PBT | 38 | 40 | Non-columnar form | 20.0 percent | 4.5 | 0.08 | 75 |
| Example 6 | PBT | 38 | 40 | Non-columnar form | 50.0 percent | 3.8 | 0.15 | 85 |
| Example 7 | PBT | 38 | 40 | Non-columnar form | 5.0 percent | 3.8 | 0.18 | 80 |
| Example 8 | PBT | 38 | 40 | Non-columnar form | 60.0 percent | 3.8 | 0.20 | 80 |

TABLE 1-continued

| | | | | | | | | |
|---|---|---|---|---|---|---|---|---|
| Example 9 | PBT | 38 | 40 | Non-columnar form | 2.0 percent | 3.8 | 0.08 | 55 |
| Example 10 | PBT | 38 | 80 | Non-columnar form | 20.0 percent | 3.8 | 0.12 | 85 |
| Example 11 | PBT | 38 | 80 | Non-columnar form | 20.0 percent | 3.8 | 0.15 | 85 |
| Example 12 | PBT | 38 | 40 | Non-columnar form | 20.0 percent | 3.8 | 0.15 | 75 |
| Example 13 | PBT | 38 | 40 | Columnar form | 5.0 percent | 3.8 | 0.10 | 80 |
| Comparative Example 1 | PBT | 10 | 40 | Non-columnar form | 20.0 percent | 1.4 | 0.08 | 50 |
| Comparative Example 2 | PBT | 38 | 40 | Non-columnar form | 20.0 percent | 5.4 | 0.22 | 80 |
| Comparative Example 3 | | | | None | | — | 0.20 | 40 |
| Comparative Example 4 | | | | None | | — | 0.38 | 60 |

Having now fully described embodiments of the present invention, it will be apparent to one of ordinary skill in the art that many changes and modifications can be made thereto without departing from the spirit and scope of embodiments of the invention as set forth herein.

What is claimed is:

1. A powder for solid freeform fabrication, comprising:
a first resin particle having a volume average particle diameter from 20 to 100 μm; and
a second resin particle having a volume average particle diameter from 20 to 100 μm,
wherein MFR2 is greater than MFR1 and a ratio of MFR2 to MFR1 is from 2 to 5,
where MFR1 represents a melt mass-flow rate (MFR) of the first resin particle and MFR2 represents a melt mass-flow rate of the second resin particle,
wherein said first resin particle has a columnar form and said second resin particle has a non-columnar form.

2. The powder according to claim 1, wherein a mass ratio of the first resin particles to the second resin particles in the powder is from 5:5 to 9.5:0.5 in the powder.

3. The powder according to claim 1, wherein a volume average particle diameter of the first resin particle is larger than a volume average particle diameter of the second resin particle.

4. A method of manufacturing a solid freeform fabrication object, comprising:
forming a layer comprising the powder of claim 1; and
at least partially melting the layer.

5. A resin powder, comprising:
a first resin particle having a volume average particle diameter from 20 to 100 μm; and
a second resin particle having a volume average particle diameter from 20 to 100 μm
wherein MFR2 is greater than MFR1 and a ratio of MFR2 to MFR1 is from 2 to 5,
where MFR1 represents a melt mass-flow rate (MFR) of the first resin particle and MFR2 represents a melt mass-flow rate of the second resin particle,
wherein said first resin particle has a columnar form and said second resin particle has a non-columnar form.

* * * * *